US011991028B1

(12) United States Patent
Bratuz et al.

(10) Patent No.: US 11,991,028 B1
(45) Date of Patent: May 21, 2024

(54) DECODING SYSTEMS AND METHODS FOR MITIGATING DISTORTIONS IN DIGITAL SIGNALS

(71) Applicant: STMicroelectronics International N.V., Geneva (CH)

(72) Inventors: Iztok Bratuz, Ankaran (SI); Vinko Kunc, Ljubljana (SI); Maksimiljan Stiglic, Maribor (SI)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 0 days.

(21) Appl. No.: 18/059,103

(22) Filed: Nov. 28, 2022

(51) Int. Cl.
*H04L 25/49* (2006.01)
(52) U.S. Cl.
CPC ............... *H04L 25/4904* (2013.01)
(58) Field of Classification Search
CPC .................................................. H04L 25/4904
See application file for complete search history.

(56) References Cited

U.S. PATENT DOCUMENTS

2016/0269195 A1\* 9/2016 Coenen ............... H02J 7/00047

OTHER PUBLICATIONS

Larcher, Philippe, "Infineon AN2358, Manchester Decoder Using PSoC® 1", Cypress Perform, Document No. 001-17375 Rev. \*E, 10 pages, retrieved from the Internet at <URL:https://www.infineon.com/dgdl/Infineon-AN2358_Manchester_Decoder_Using_PSoC_1-ApplicationNotes-v06_00-EN.pdf?fileId=8ac78c8c7cdc391c017d073743355aa8> on Jan. 13, 2023, 11 pages.

\* cited by examiner

*Primary Examiner* — Nader Bolourchi
(74) *Attorney, Agent, or Firm* — Alston & Bird LLP

(57) ABSTRACT

Various embodiments of the present disclosure disclose decoding techniques for mitigating data corruption due to duty cycle distortion, jitter, and other distortions to a digital signal. Decoding processes, apparatuses, and systems are provided that utilize a decoding framework for improving the accuracy of output bit streams generated from digital signals. An example process receives data indicative of a digital signal, generates a signal measurement for the digital signal that includes signal length descriptive between a two rising edges of a digital signal or two falling edges of the demodulated digital signal, and generates at least one portion of an output bit stream for the digital signal based at least in part on the signal measurement.

20 Claims, 11 Drawing Sheets

DECODING SYSTEMS AND METHODS FOR MITIGATING DISTORTIONS IN DIGITAL SIGNALS

TECHNOLOGICAL FIELD

Background

Applicant has identified many technical challenges and difficulties associated with lightweight solutions for decoding encoded data streams. Through applied effort, ingenuity, and innovation, Applicant has solved problems related to duty cycle distortion and jitter error prone decoding techniques by developing solutions embodied in the present disclosure, which are described in detail below.

BRIEF SUMMARY

Various embodiments described herein relate to systems, apparatuses, products, and methods for decoding digital signals.

In accordance with some embodiments of the present disclosure, a decoding apparatus comprising digital circuitry is provided. The digital circuitry can be configured to: receive data indicative of a demodulated digital signal; generate a signal measurement for the demodulated digital signal, wherein the signal measurement comprises at least one signal length descriptive of: (i) a positive length between a first rising edge of the demodulated digital signal and a second consecutive rising edge of the demodulated digital signal or (ii) a negative length between a first falling edge of the demodulated digital signal and a second consecutive falling edge of the demodulated digital signal; and generate at least one portion of an output bit stream for the demodulated digital signal based at least in part on the signal measurement.

In accordance with some embodiments of the present disclosure, a computer-implemented method in provided. The computer-implemented method includes receiving data indicative of a demodulated digital signal; generating a signal measurement for the demodulated digital signal, wherein the signal measurement comprises at least one signal length descriptive of: (i) a positive length between a first rising edge of the demodulated digital signal and a second consecutive rising edge of the demodulated digital signal or (ii) a negative length between a first falling edge of the demodulated digital signal and a second consecutive falling edge of the demodulated digital signal; and generating at least one portion of an output bit stream for the demodulated digital signal based at least in part on the signal measurement.

In accordance with some embodiments of the present disclosure, a computing system is provided. The computing system comprises at least one decoding apparatus and one or more radio transmission devices. The at least one decoding apparatus can be configured to: receive data indicative of a demodulated digital signal based at least in part on one or more electrical signals from the one or more radio transmission devices; generate a signal measurement for the demodulated digital signal, wherein the signal measurement comprises at least one signal length descriptive of: (i) a positive length between a first rising edge of the demodulated digital signal and a second consecutive rising edge of the demodulated digital signal or (ii) a negative length between a first falling edge of the demodulated digital signal and a second consecutive falling edge of the demodulated digital signal; and generate at least one portion of an output bit stream for the demodulated digital signal based at least in part on the signal measurement.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below.

BRIEF SUMMARY OF THE DRAWINGS

Figure 1:
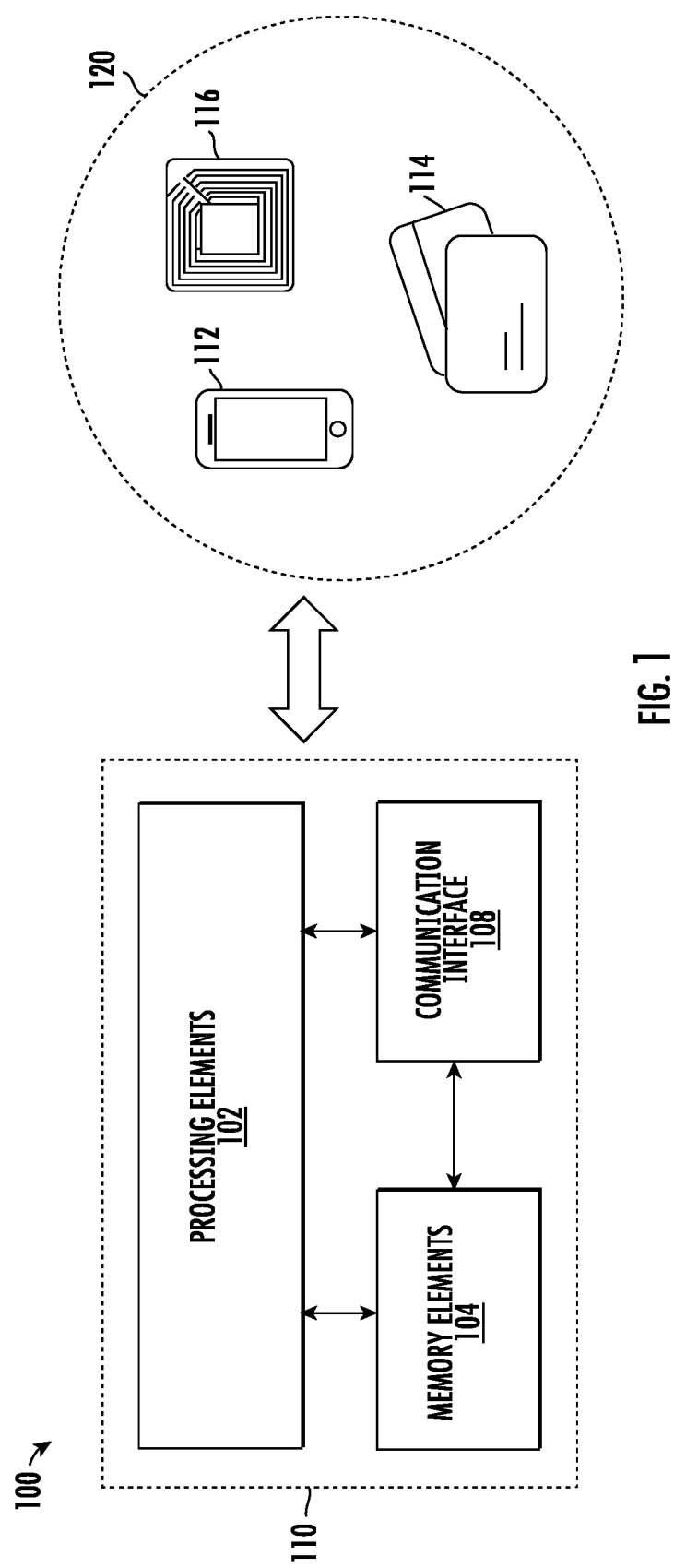
Figure 2:
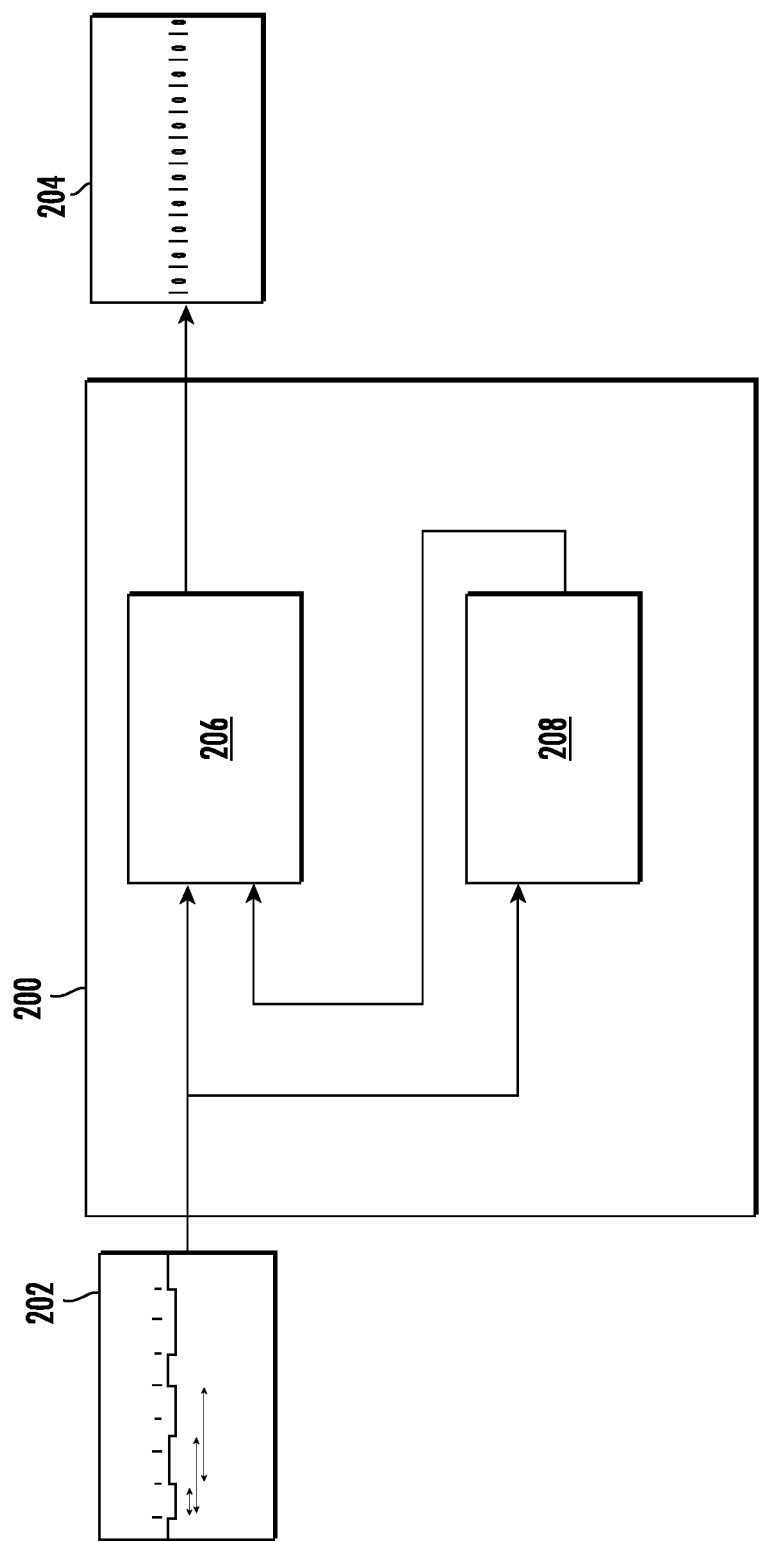
Figure 3:
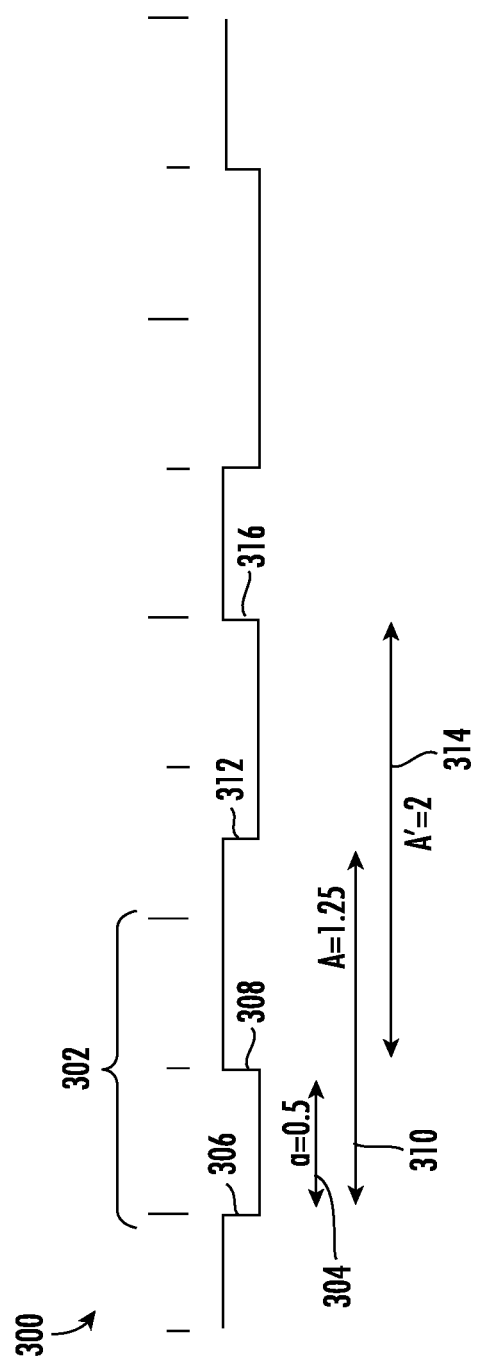
Figure 4A:
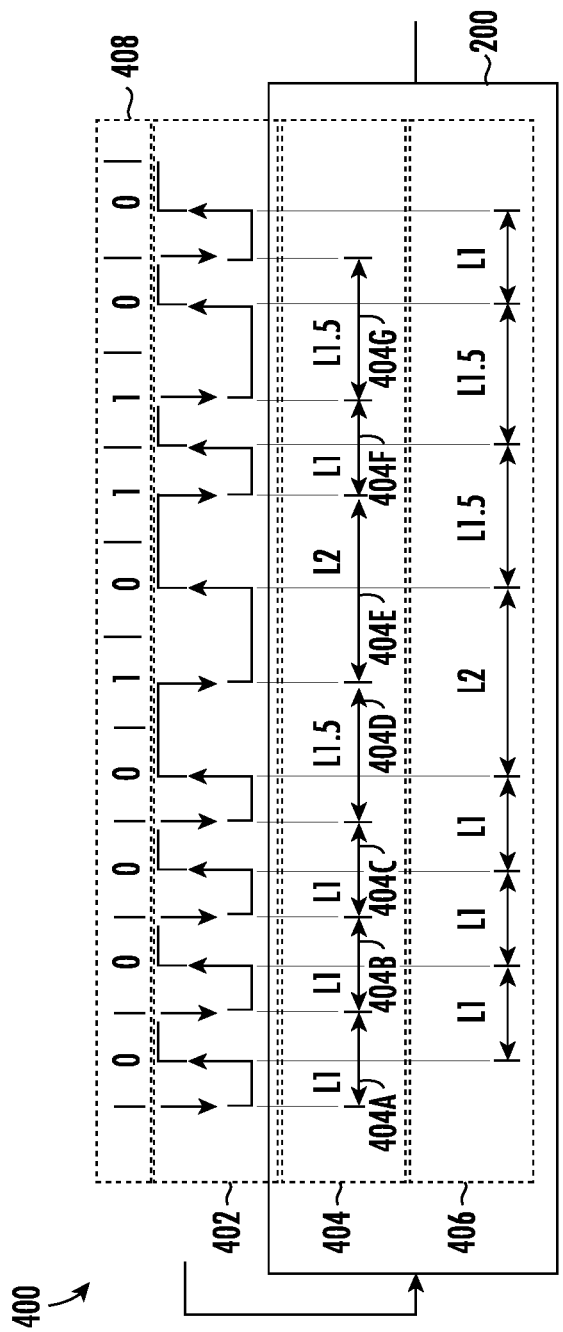
Figure 4B:
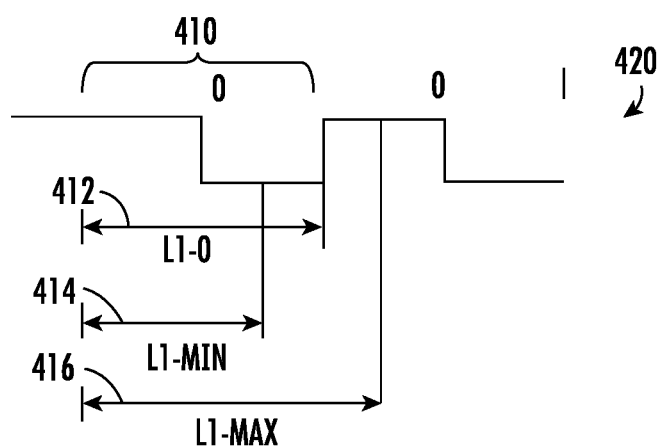
Figure 4C:
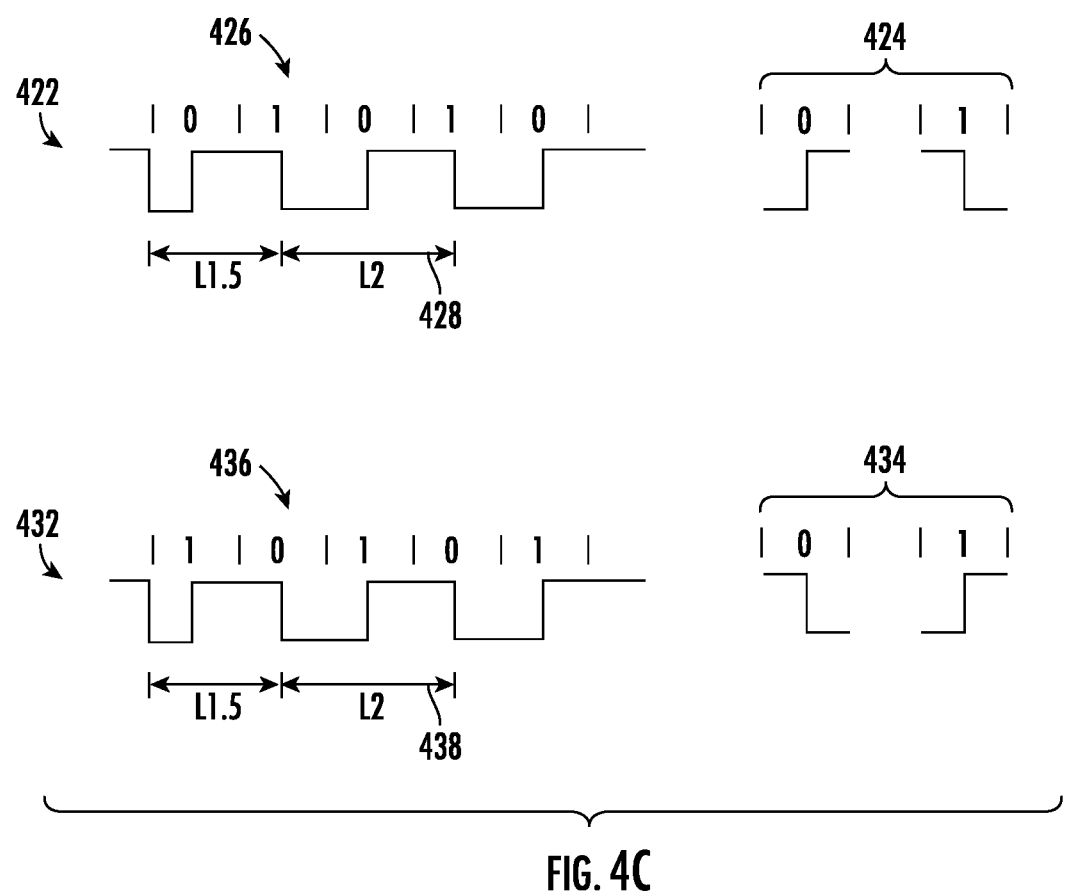
Figure 5:
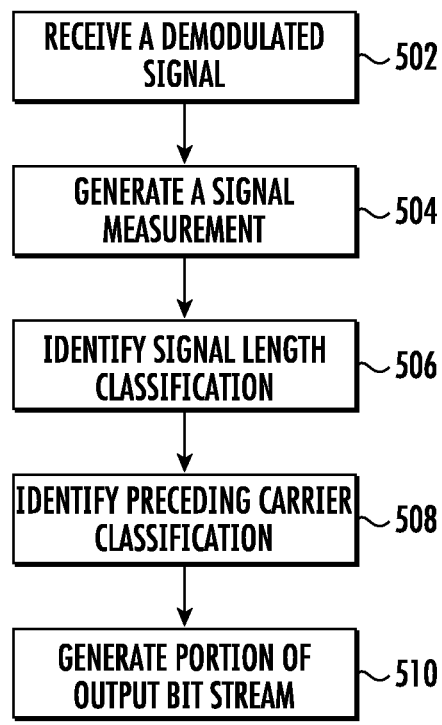
Figure 6:
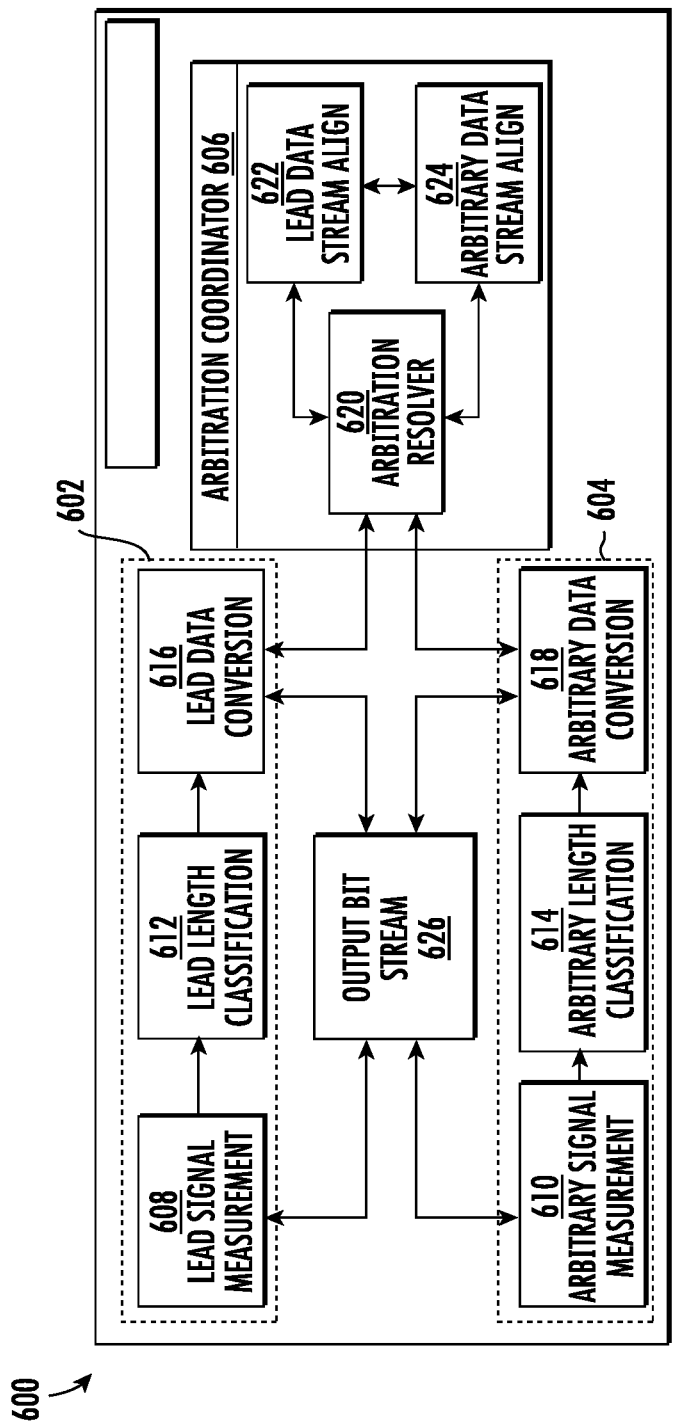
Figure 7:
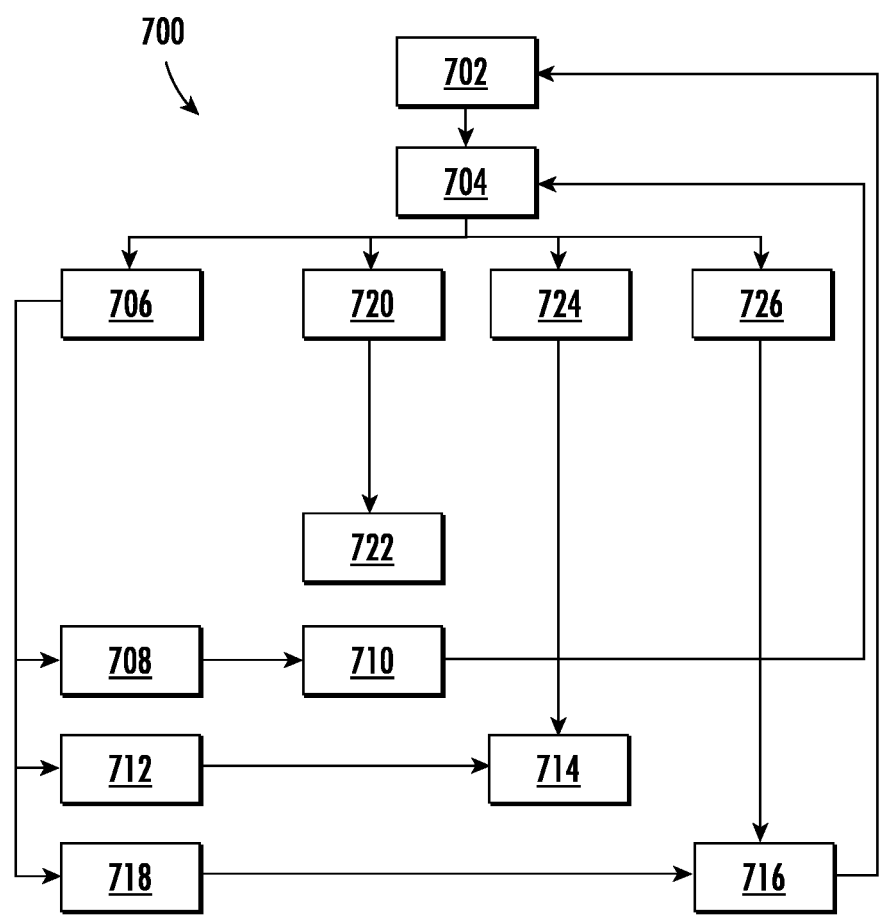
Figure 8:
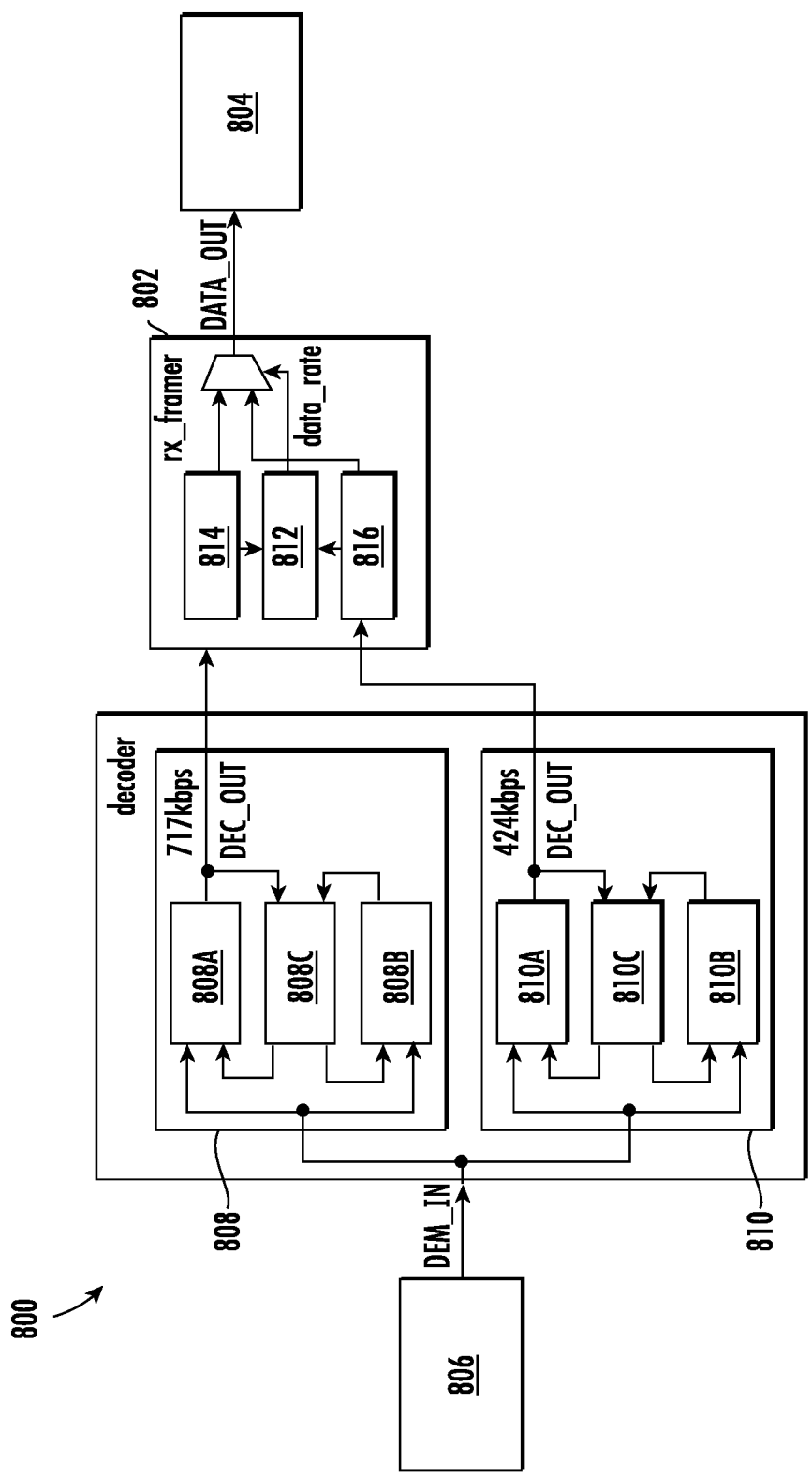
Figure 9:
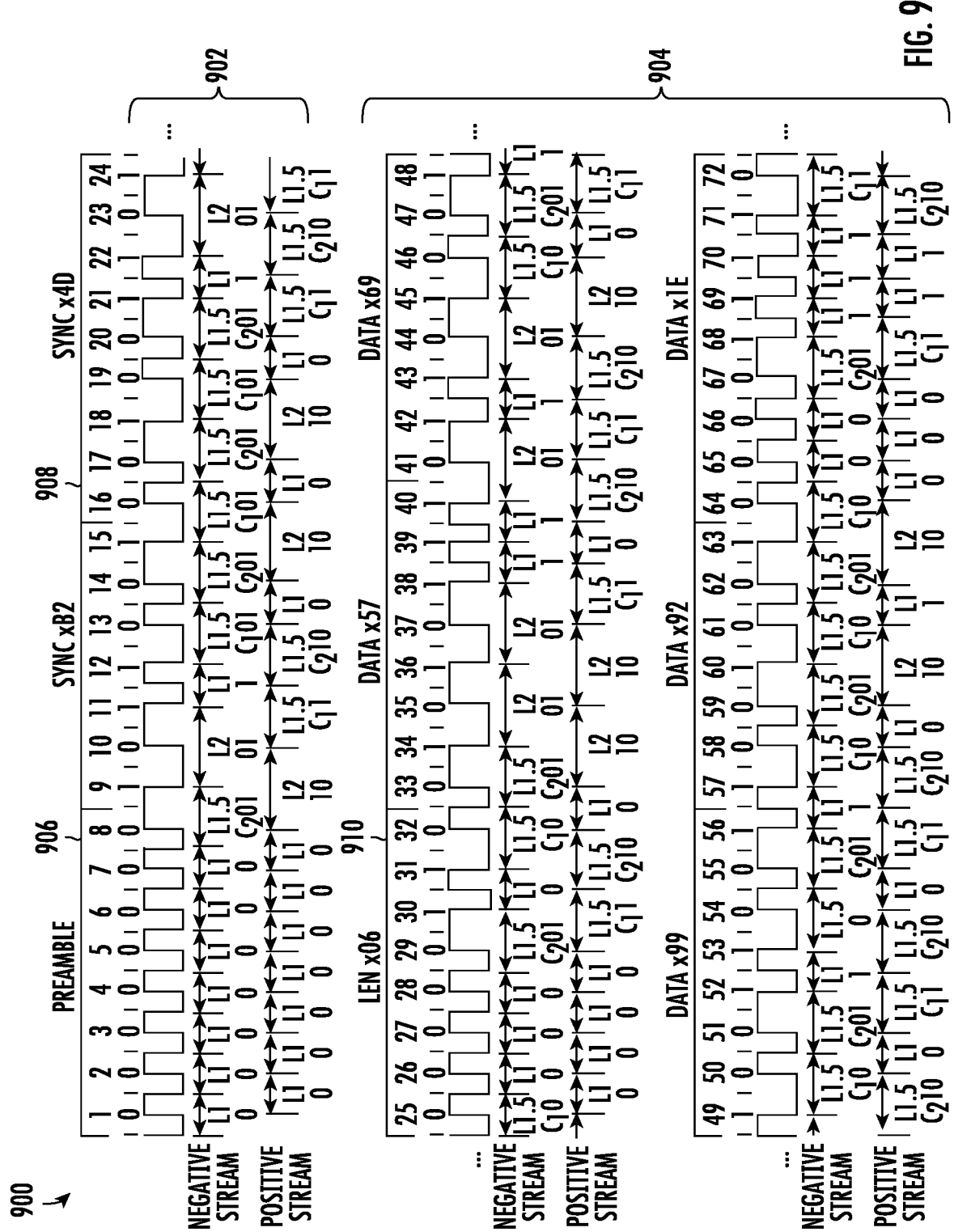

Having thus described certain example embodiments of the present disclosure in general terms, reference will now be made to the accompanying drawings, which are not necessarily drawn to scale, and wherein:

FIG. 1 illustrates an example computing entity in accordance with one or more embodiments of the present disclosure;

FIG. 2 illustrates an example decoding apparatus in accordance with one or more embodiments of the present disclosure;

FIG. 3 illustrates an example demodulated digital signal in accordance with one or more embodiments of the present disclosure;

FIG. 4A illustrates an operational example of a decoding process in accordance with one or more embodiments of the present disclosure;

FIG. 4B illustrates an operational example of a clock cycle range for a first length classification in accordance with one or more embodiments of the present disclosure;

FIG. 4C illustrates an operational example of for decoding a third length classification in accordance with one or more embodiments of the present disclosure;

FIG. 5 illustrates a flowchart diagram of an example process for generating an output bit stream in accordance with one or more embodiments of the present disclosure;

FIG. 6 illustrates a block diagram of an example process for generating an output bit stream in accordance with one or more embodiments of the present disclosure;

FIG. 7 illustrates a block diagram of an example process for generating an output bit stream in accordance with one or more embodiments of the present disclosure;

FIG. 8 illustrates an example decoding system in accordance with one or more embodiments of the present disclosure; and FIG. 9 illustrates an operational example of an output bit stream generated for a FeliCa based demodulated digital signal in accordance with one or more embodiments of the present disclosure.

DETAILED DESCRIPTION

Embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Various embodiments of the present disclosure are directed to improved systems, apparatuses, products, and methods for decoding digital signals. The present disclosure describes a decoding framework for improving the accuracy of output bit streams decoded from digital signals by mitigating negative impacts to such digital signals caused by jitter, duty cycle distortion, and/or any other unintentional manipulation of the digital signal. The decoding framework can be applied to any type of coded digital signal including, for example, digital signals representative of Manchester encoded data streams. Among other improvements, by improving the accuracy of output bit streams, the decoding framework can be leveraged to improve radio-frequency identification (RFID) and/or near field communication (NFC) techniques with passive cards such as, for example, Felicity Card (FeliCa), near-field communication type F (NFC-F), and/or the like that can code data using Manchester coding algorithms.

As one example, the decoding framework of the present disclosure can be utilized for RFID communications used by passive or active cards with RFID tags. A receive channel of an RFID tag can include a demodulator and a decoder. Demodulators can include analog circuits that extract a modulated bit stream using various modulation techniques which can be superimposed on a resulting demodulated digital signal. The decoder can include decoding circuitry that can convert outputs of the demodulator to an output bit stream. The accuracy of the output bit stream can depend on the similarity of the demodulated digital signal to the original digital signal. The similarity of two digital signals can be impacted by distortions to the demodulated digital signal, which can impact the accuracy of data decoded from the demodulated digital signal. Two such types of demodulator output distortions, for example, can include duty cycle distortion and jitter.

In case of duty cycle distortion, a pulse width (e.g., a distance between a falling/negative edge to a rising/positive edge of a digital signal and/or from a rising/positive edge to falling/negative edge of the digital signal) may be distorted. Pulse width distortion may also be caused by other physical processes applied which have different impacts on extracting the position of rising/falling edges of a demodulated digital signal. By way of example, power harvesting from signals induced on a reader antenna can slow down a rising edge and, as a consequence, the duration of rising and falling edge may be distorted. These distortions can shift the distances between conventionally measured components of a demodulated digital signal which can negatively impact the accuracy of a resulting output bit stream.

In the case of jitter, random variations can be induced between rising and falling edges of the demodulated digital signal. Jitter can be created by different physical phenomena including noise, external disturbance, uncertainty of demodulator output sampling, and/or the like. These random variations can negatively impact the accuracy of a resulting output bit stream and can be increasingly detrimental to demodulated digital signals with low modulation indexes in which the ratio between noise and the modulated signal can be tied to the accuracy of a resulting output bit stream.

To accommodate for distortions to demodulated digital signals, conventional decoders include robust decoders that utilize and consume robust processing resources and power to apply decoding techniques based at least in part correlators. These techniques rely on robust, external, processing, and power resources that are expensive, in some cases, not available, and are not suitable for light weight decoders such as those utilized for RFID communications with passive cards. Other decoders that do not rely on robust processing resources apply decoding techniques that are based at least in part on the detection of high and low states of a demodulated digital signal. This, for example, can be based at least in part on the detection and the position of a rising/positive edge (e.g., for a high state) and/or a falling/negative edge (e.g., for a low state) of a demodulated digital signal. Still other decoders apply decoding techniques that are based at least in part on the distance between the rising and falling edges of the demodulated digital signal. Each of these techniques are susceptible to distortions to the demodulated digital signal such as duty cycle distortion, jitter, and/or the like.

Thus, in some examples, there is a need for improved lightweight decoding techniques that increase the accuracy of output bit streams decoded from demodulated digital signals in the presence of distortions such as duty cycle distortion, jitter, and/or the like. The embodiments described herein improve upon decoding techniques by providing light weight decoding systems, methods, apparatuses, and frameworks that mitigate such distortions to demodulated digital signals. For example, some embodiments of the present disclosure provide decoding frameworks for decoding Manchester based coded signals. Unlike previous techniques, a demodulated digital signal is decoded based at least in part on signal measurements including lengths between edges of the same sign (e.g., a distance between a falling/negative edge to a next consecutive falling/negative edge, a distance between a rising/positive edge to a next consecutive rising/positive edge, and/or the like). Each signal measurements is classified into one of a plurality of defined length classifications and then converted to a portion of an output bit stream based at least in part on the length classification in accordance with a specific rules-based decoding framework. In some embodiments, further improvements to the accuracy of the resulting output bit stream can be enabled by simultaneously generating multiple output bit streams based at least in part on the opposite edges of the demodulated digital signal.

It should be readily appreciated that the embodiments of the systems, apparatus, and methods described herein may be configured in various additional and alternative manners in addition to those expressly described herein.

FIG. 1 illustrates an example computing system 100 in accordance with one or more embodiments of the present disclosure. In general, the terms computing system, computer, system, device, entity, and/or similar words used herein interchangeably can refer to, for example, one or more computers, computing entities, desktops, mobile phones, tablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes can include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

The computing system 100 can include a computing apparatus 110 and/or one or more external computing entities 120. The computing apparatus 110 can include any computing device including, for example, a decoding apparatus specially configured to perform one or more operations of a decoding process. In some embodiments, the decoding apparatus can include and/or be in association with an RFID reader, an NFC reader, and/or the like. The decoding apparatus can be configured to receive and/or transmit one or more radio signals between the one or more external computing entities 120. The external computing entities 120, for example, can include and/or be associated with one or more radio transmission devices. The one or more radio transmission devices, for example, can include one or more RFID, NFC, and/or any other radio-based tags configured to transmit and/or receive electrical signals. The one or more radio transmission devices can include one or more passive tags configured to collect energy from a nearby RFID reader's interrogating electrical waves and/or one or more active tags including a local power source. In some example embodiments, the external computing entities 120 can include one or more mobile device(s) 112 (e.g., mobile phones, smart watches, etc.), one or more passive/active cards 114 (e.g., contactless cards, FeliCa-based identification cards, etc.), one or more passive/active tags 116 (e.g., RFID tags, NFC tags, etc.), and/or the like. According to some embodiments, the external computing entities 120 can be configured to generate and/or transmit electrical signals in accordance with one or more communication, encryption, and/or coding standards such as, for example, NFC forum standards, Felica protocols, and/or the like.

The computing apparatus 110 can include, or be in communication with, one or more processing elements 102 (also referred to as processors, processing circuitry, digital circuitry, and/or similar terms used herein interchangeably) that communicate with other elements within the computing apparatus 110 via a bus, for example. As will be understood, the processing element 102 can be embodied in a number of different ways.

For example, the processing element 102 can be embodied as one or more complex programmable logic devices (CPLDs), microprocessors, multi-core processors, coprocessing entities, application-specific instruction-set processors (ASIPs), microcontrollers, and/or controllers. Further, the processing element 102 can be embodied as one or more other processing devices or circuitry. The term circuitry can refer to an entirely hardware embodiment or a combination of hardware and computer program products. Thus, the processing element 102 can be embodied as integrated circuits, application specific integrated circuits (ASICs), field programmable gate arrays (FPGAs), programmable logic arrays (PLAs), hardware accelerators, digital circuitry, and/or the like.

As will therefore be understood, the processing element 102 can be configured for a particular use or configured to execute instructions stored in volatile or non-volatile media or otherwise accessible to the processing element 102. As such, whether configured by hardware or computer program products, or by a combination thereof, the processing element 102 can be capable of performing steps or operations according to embodiments of the present disclosure when configured accordingly.

In one embodiment, the computing apparatus 110 can further include, or be in communication with, one or more memory elements 104. The one or more memory elements 104 can include non-volatile and/or volatile media. The memory elements 104, for example, can include non-volatile media (also referred to as non-volatile storage, memory, memory storage, memory circuitry and/or similar terms used herein interchangeably). In one embodiment, the non-volatile storage or memory can include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media can store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably can refer to a collection of records or data that is stored in a computer-readable storage medium using one or more database models, such as a hierarchical database model, network model, relational model, entity-relationship model, object model, document model, semantic model, graph model, and/or the like.

In addition, or alternatively, the memory elements 104 can include volatile memory. For example, the computing apparatus 110 can further include, or be in communication with, volatile media (also referred to as volatile storage memory, memory storage, memory circuitry and/or similar terms used herein interchangeably). In one embodiment, the volatile storage or memory can also include one or more volatile storage or memory media, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media can be used to store at least portions of the databases, database instances, database management systems, data, applications, programs, program modules, scripts, source code, object code, byte code, compiled code, interpreted code, machine code, executable instructions, and/or the like being executed by, for example, the processing element 102. Thus, the databases, database instances, database management systems, data, applications, programs, program modules, scripts, source code, object code, byte code, compiled code, interpreted code, machine code, executable instructions, and/or the like can be used to control certain aspects of the operation of the computing apparatus 110 with the assistance of the processing element 102 and operating system.

As indicated, in one embodiment, the computing apparatus 110 can also include one or more communication interfaces 108 for communicating with various computing entities, including external computing entities 120, such as by communicating data, content, information, and/or similar terms used herein interchangeably that can be transmitted, received, operated on, processed, displayed, stored, and/or the like. The one or more communication interfaces 108, for example, can include one or more wired peripherals (e.g., fiber interfaces, ethernet ports, and/or the like), antenna, transmitters, receivers, digital to analog converters (DAC), analog to digital converters (ADC), modulators, demodulators, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing apparatus 110 can be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, NFC protocols such as NFC-A, NFC-B, NFC-F, Wibree, Bluetooth protocols, wireless universal serial bus (USB) protocols, and/or any other wireless protocol.

The computing apparatus 110 can include input/output circuitry for communicating with one or more users. The input/output circuitry, for example, can include one or more user interfaces for providing and/or receiving information from one or more users of the computing apparatus 110. The input/output interfaces can include one or more tactile interfaces (e.g., keypads, touch screens, etc.), one or more audio interfaces (e.g., microphones, speakers, etc.), visual interfaces (e.g., display devices, etc.), and/or the like. The input/output circuitry can be configured to receive user input through one or more of the user interfaces from a user of computing apparatus 110 and provide data to a user through the one or more of the user interfaces.

Example embodiments of the present disclosure describe a specific rules-based decoding framework for decoding digital signals such as, for example, those representing Manchester coded data streams. The decoding framework defines specific rules-based techniques to accurately decode digital signals in the presence of distortions such as duty cycle distortion, jitter, and/or the like. The decoding framework can be leveraged by one or more systems, apparatus, processes, and/or the like that accurately generate an output bit stream for a digital signal. By way of example, the decoding framework can be leveraged by the computing apparatus 110 such as, for example, the one or more decoding apparatus described herein to accurately generate an output bit stream for a digital signal generated based at least in part on radio signals from one or more external computing entities 120.

FIG. 2 illustrates an example decoding apparatus 200 in accordance with one or more embodiments of the present disclosure. The decoding apparatus 200 can include a computing entity configured to apply the decoding framework to generate an output bit stream 204 for a demodulated digital signal 202. By way of example, the decoding apparatus 200 can include one or more digital circuits, computer-implemented memories, synchronized clocks, and/or any other computing component specially configured to perform operations defined by the decoding framework to generate the output bit stream 204 for the demodulated digital signal 202.

The decoding apparatus 200 can receive data indicative of the demodulated digital signal 202. The demodulated digital signal 202 can be based at least in part on one or more electrical signals transmitted by and/or received from one or more radio transmission devices such as, for example, one or more mobile device(s) (e.g., mobile phones, smart watches, etc.), one or more passive/active cards (e.g., contactless cards, FeliCa-based identification cards, etc.), one or more passive/active tags (e.g., RFID tags, NFC tags, etc.), and/or the like. The electrical signals can include modulated signals that can be demodulated by a demodulator of the decoding apparatus 200 to generate the demodulated digital signal 202.

For instance, the demodulated digital signal 202 can include a baseband signal provided by a demodulator. By way of example, the demodulated digital signal 202 can be generated by a demodulator. The demodulator can include any device configured to extract a varying information carrying signal from a signal formed by varying a characteristic of repetitious electrical and/or electromagnetic waves. The demodulated digital signal 202, for example, can include an information carrying signal from a modulated electrical signal. The demodulator can include any type of demodulation device including, as examples, one or more slope detectors, ratio detectors, phase-locked loops, etc. In some embodiments, the demodulator can be based at least in part, on a modulation scheme used for the modulated electrical signal.

The modulation and/or demodulation of an electrical signal can lead to phenomena such as duty cycle distortion and/or jitter, each of which can reduce the accuracy of the output bit stream 204 decoded from the demodulated digital signal 202. To address such technical challenges, the decoding apparatus 200 can generate a signal measurement for the demodulated digital signal 202 that is resistant to duty cycle distortion, jitter, and/or other potential distortions to radio/electrical/digital signals. For example, a demodulated digital signal 202 can be decoded by observing certain metrics of the demodulated digital signal 202. The metrics can include distances, lengths, and/or times measured between two edges of the digital signal of the same type (e.g., a falling/negative edge to a next consecutive falling/negative edge and/or rising/positive edge to a next consecutive rising/positive edge). A length and/or distance between two edges of a digital signal, for example, can be measured in time such as, for example, as a number of clock cycles of a synchronized clock of the decoding apparatus 200.

FIG. 3 illustrates an example demodulated digital signal 300 in accordance with one or more embodiments of the present disclosure. The demodulated digital signal 300 can include a digital signal representation of an encoded data steam. The encoded data stream can include a Manchester encoded data stream. By way of example, in some embodiments, the encoded data stream can include a FeliCA communication.

The demodulated digital signal 300 can be interpreted by signal measurements that respectively measure a single length at one or more portions of the digital signal representation. A signal length, for example, can be measured in time. By way of example, a signal length can be measured by a plurality of clock cycles between one or more portions of the demodulated digital signal 300. In some embodiments, a signal length can be indicative of a code duration 302 for a unit of the coded data stream. By way of example, the code duration 302 can include a duration of one Manchester coded data bit and the signal length can be indicative of one or more portions of one or more Manchester coded data bits.

A signal measurement can include one or more edge lengths. Each edge length can include length between at least two edges of the demodulated digital signal 300. By way of example, an edge length 304 can include a duration of time between a first edge of the demodulated digital signal 300 and a second edge of the demodulated digital signal 300. The first edge, for example, can include a first falling edge 306 (e.g., a negative edge) of the demodulated digital signal 300 and the second edge can include a first rising edge 308

(e.g., a positive edge) of the demodulated digital signal 300. As illustrated, the edge length 304 can include half (e.g., 0.5) of a code duration 302 of a coded data stream. In case of duty cycle distortion, pulse lengths such as the edge length 304 (e.g., from a falling/negative edge to a rising/positive edge) can become distorted. To accommodate for such distortions, embodiments of the present disclosure can leverage a signal measurement that is descriptive of a time between two consecutive edges of the same sign.

For example, to mitigate duty cycle distortion, jitter, and/or other negative impacts to an output bit stream, the signal measurement can include at least one signal length that is descriptive of a negative signal length 310 between a first falling edge 306 of the demodulated digital signal 300 and a second consecutive falling edge 312 of the demodulated digital signal 300. As illustrated, the negative signal length 310 can include one or more portions (e.g., 1.25) of a code duration 302 of a coded data stream. In addition, or alternatively, the signal measurement can include at least one signal length that is descriptive of a positive signal length 314 between a first rising edge 308 of the demodulated digital signal 300 and a second consecutive rising edge 316 of the demodulated digital signal 300. As illustrated, the positive signal length 314 can include one or more portions (e.g., 2) of a code duration 302 of a coded data stream.

The negative signal length 310 and the positive signal length 314 can remain consistent despite the presence of duty cycle distortion. In this way, instead of observing high and low levels of the demodulated digital signal 300, some embodiments of the present disclosure can accommodate for duty cycle distortion by measuring lengths between two consecutive high (e.g., rising/positive) and/or two consecutive low (e.g., falling/negative) levels of the demodulated digital signal 300. Signal measurements between edges of one sign (e.g., falling to falling and/or rising to rising) can be leveraged to improve the accuracy and the reliability of output bit streams decoded from the demodulated digital signal 300.

Turning back to FIG. 2, the decoding apparatus 200 generates at least one portion of the output bit stream 204 for the demodulated digital signal 202 based at least in part on a signal measurement of the demodulated digital signal 202. The decoding apparatus 200, for example, can include one or more decoders each associated with at least one length type.

A first decoder, for example, can include a negative decoder 206 associated with a negative length type of the demodulated digital signal 202. The negative decoder 206 can include digital circuitry that can be configured to generate the output bit stream 204 for the demodulated digital signal 202 based at least in part on a plurality of negative signal lengths between a plurality falling edges of the demodulated digital signal 202.

As another example, a second decoder can include a positive decoder 208 associated with a positive length type of the demodulated digital signal 202. The positive decoder 208 can include digital circuitry that can be configured to generate the output bit stream 204 for the demodulated digital signal 202 based at least in part on a plurality of positive signal lengths between a plurality rising edges of the demodulated digital signal 202.

FIG. 4A illustrates an operational example 400 of a decoding process in accordance with one or more embodiments of the present disclosure. The operational example 400 of the decoding process can be implemented by the decoding apparatus 200 to generate the output bit stream 408 from the demodulated digital signal 402. For example, the decoding apparatus 200 can generate at least one of (i) a plurality of negative signal measurements 404 for the demodulated digital signal 402 and/or (ii) a plurality of positive signal measurements 406 for the demodulated digital signal 402. The decoding apparatus 200 can leverage a specific rules-based decoding framework to generate the output bit stream 408 for the demodulated digital signal 402 based at least in part on (i) the plurality of negative signal measurements 404 and/or (ii) the plurality of positive signal measurements 406.

The decoding apparatus 200 can generate the output bit stream 408 for the demodulated digital signal 402 by generating a measurement stream including a sequence of signal measurements such as, for example, the plurality of negative signal measurements 404 and/or the plurality of positive signal measurements 406, respectively. Using the decoding framework, the decoding apparatus 200 can identify a length classification for each signal measurement of the measurement stream and generate the output bit stream 408 based at least in part on the length classification for each signal measurement of the measurement stream. For example, the output bit stream 408 can be generated based at least in part on a length classification identified for each of the plurality of negative signal measurements 404. In addition, or alternatively, the output bit stream 408 can be independently generated based at least in part on a length classification identified for each of the plurality of positive signal measurements 406.

In some examples, a length classification for a signal measurement can include one of a plurality of different length classifications associated with a signal length of the signal measurement. For example, the decoding apparatus 200 can identify a length classification for signal measurement from a plurality defined length classifications. The length classifications, for example, can be defined at least in part by the decoding framework. The plurality of defined length classifications can be based at least in part on one or more different ranges of signal lengths.

For example, the plurality of defined length classifications can include a first length classification (e.g., L1). The first length classification can include a first range of signal measurements. The first range of signal measurements can be based at least in part on a timing associated with a single unit of a coded data stream such as, for example, a single coded data bit of a Manchester coded data stream. The first length classification, for example, can be based at least in part on one Manchester coded data bit duration.

The plurality of defined length classifications can include a second length classification (e.g., L1.5). The second length classification can include a second range of signal measurements. The second range of signal measurements can be based at least in part on a timing associated with one and a half units of a coded data stream such as, for example, one and a half coded data bits of a Manchester coded data stream. The second length classification, for example, can be based at least in part on one and a half Manchester coded data bit durations.

The plurality of defined length classifications can include a third length classification (e.g., L2). The third length classification can include a third range of signal measurements. The third range of signal measurements can be based at least in part on a timing associated with two units of a coded data stream such as, for example, two coded data bits of a Manchester coded data stream. The third length classification, for example, can be based at least in part on two Manchester coded data bit durations.

A defined length classification can be associated with a particular time range. The time range can include a clock cycle range. For example, the decoding apparatus 200 can include synchronized clock circuitry including one or more synchronized clocks operatable at one or more different clock frequencies such as, for example, 13.56 megahertz, and/or the like. A respective length classification can be associated with a clock cycle range of a respective synchronized clock. In some embodiments, the clock cycle range can be based at least in part on the clock frequency of the respective synchronized clock. In addition, or alternatively, the clock cycle range can be based at least in part on (i) a data transfer rate associated with the demodulated digital signal and/or (ii) one or more coded data stream durations such as, for example, one or more Manchester coded data bit durations.

By way of example, a demodulated digital signal can be associated with a plurality of different data transfer rates and/or coded data streams. In some embodiments, the decoding framework can define one or more different clock cycle ranges for a length classification based at least in part on (i) a particular data transfer rate, (ii) a coded data stream associated with a demodulated digital signal, and/or (iii) a clock frequencies of a respective synchronized clock.

FIG. 4B illustrates an operational example of a clock cycle range for a first length classification in accordance with one or more embodiments of the present disclosure. The first length classification can be associated with one bit duration 410 of a coded data stream 420. The first length classification can include a clock cycle range that is defined by a threshold number of clock cycles before and after a number of clock cycles corresponding to the one bit duration 410 of the coded data stream 420.

By way of example, the one bit duration 410 can correspond to a first number of clock cycles 412 and the clock cycle range can be defined by (i) a minimum number of clock cycles 414 that is a threshold number of clock cycles before the first number of clock cycles 412 and/or (ii) a maximum number of clock cycles 416 that is a threshold number of clock cycles after the first number of clock cycles 412. The first number of clock cycles 412, the minimum number of clock cycles 414, and the maximum number of clock cycles 416 can each be based at least in part on (i) the particular data transfer rate, (ii) the coded data stream associated with a demodulated digital signal, and/or (iii) a clock frequency of a respective synchronized clock.

By way of example, the first number of clock cycles 412, L1(0), corresponding to the one bit duration 410 of the coded data stream 420 can determined based at least in part on the clock frequency, $f_{clk}$, divided by the data transfer rate, data rate, as denoted by:

$$L1(0) = \frac{f_{clk}}{\text{data\_rate}}.$$

The minimum number of clock cycles 414, L1(min), can include: L1(min)=0.75*L1(0). The maximum number of clock cycles 416, L1(max), can include: L1(min)=1.25*L1(0). These examples represent just one potential embodiment of the present disclosure. A person of ordinary skill in art would understand that these ranges can be smaller, larger, and/or asymmetrical based at least in part on the properties of a demodulated signal.

In some embodiments, a second minimum number of clock cycles, L1.5(min) for the second length classification can include: L1.5(min)=1.25*L1(0)+1. And, the second maximum number of clock cycles, L1.5(max), for the second length classification can include: L1.5(max)=1.75*L1(0). In some embodiments, a third minimum number of clock cycles, L2(min) for the third length classification can include: L2(min)=1.75*L1(0)+1. And, the third maximum number of clock cycles, L2(max), for the third length classification can include: L2(max)=2.25*L1(0).

According to some examples, (i) a demodulated digital signal can be associated with a first data transfer rate (e.g., 212 kbps) and/or a second data transfer rate (e.g., 424 kbps), (ii) the coded data stream can include a Manchester coded data stream, and/or (iii) a clock frequencies of a respective synchronized clock can include 13.56 megahertz. In such a case, the decoding framework can define a different clock cycle range for a respective length classification based at least in part on whether the demodulated digital signal is associated with the first or second data transfer rate.

As one example, the decoding framework can define a first clock cycle range for the first length classification and the first data transfer rate. The first clock cycle range can include a range of fifty two to seventy four (e.g., 52-74) clock cycles. The decoding framework can define a first clock cycle range for the second length classification and the first data transfer rate. The first clock cycle range can include a range of eighty four to one hundred and six (e.g., 84-106) clock cycles. The decoding framework can define a first clock cycle range for the third length classification and the first data transfer rate. The first clock cycle range can include a range of one hundred and sixteen to one thirty eight (e.g., 116-138) clock cycles.

In addition, or alternatively, the decoding framework can define a second clock cycle range for the first length classification and the second data transfer rate. The second clock cycle range can include a range of twenty six to thirty seven (e.g., 26-37) clock cycles. The decoding framework can define a second clock cycle range for the second length classification and the second data transfer rate. The second clock cycle range can include a range of forty two to fifty three (e.g., 42-53) clock cycles. The decoding framework can define a second clock cycle range for the third length classification and the second data transfer rate. The second clock cycle range can include a range of fifty eight to sixty nine (e.g., 58-69) clock cycles.

The decoding apparatus 200 can identify a length classification for the at least one signal length based at least in part on a comparison between a plurality of clock cycles associated with the signal measurement and a clock cycle range of a defined length classification.

In some embodiments, the decoding apparatus 200 can decode the demodulated digital signal 402 using one or more of at least two measurement streams. Each measurement stream can respectively include a plurality of signal measurements for the demodulated digital signal of a particular measurement type. A signal measurement of a particular measurement type can include a signal length of a particular length type. By way of example, the at least two measurement streams can include a negative measurement stream including the plurality of negative signal measurements 404 each including a negative signal length of a negative length type (e.g., between two falling/negative edges of the demodulated digital signal). In addition, or alternatively, the at least two measurement streams can include a positive measurement stream including the plurality of positive signal measurements 406 each including a positive signal length of a positive length type (e.g., between two rising/positive edges of the demodulated digital signal).

Each measurement stream can be independently leveraged to generate the output bit stream 408. For example, the output bit stream 408 for the demodulated digital signal 402 can be based at least in part on length metrics from a single measurement stream (either positive or negative). In this manner, two streams can be independently decoded into an output bit stream 408. In some embodiments, multiple respective output bit streams can be generated for the demodulated digital signal 402 using each of the at least two measurement streams. In such a case, multiple respective output bit streams can be compared to determine a confidence level for the output bit streams. By way of example, one or more correlations between the multiple streams can increase a confidence level for the output bit streams. In some embodiments, the one or more correlations between the multiple streams can be leveraged for error correction. For instance, in the event of an occurrence of an error for one stream, another, opposite, stream can be used to resolve the error.

Each measurement stream generated from the demodulated digital signal 402 can be decoded in a similar manner. For example, for a respective measurement stream, the decoding apparatus 200 can generate a signal measurement, identify a length classification for the signal measurement, and generate a portion of the output bit stream 408 based at least in part on the length classification for the signal measurement.

Taking a negative measurement stream as an example, the demodulated digital signal 402 can be analyzed to extract a plurality of negative signal measurements 404. The plurality of negative signal measurements 404 can be indicative of a plurality of sequential negative signal lengths between each of a plurality of falling/negative edges of the demodulated digital signal 402. The plurality of negative signal measurements 404, for example, can include a first negative signal measurement 404A identified as a first length classification, a second negative signal measurement 404B identified as a first length classification subsequent to the first negative signal measurement 404A, a third negative signal measurement 404C identified as a first length classification subsequent to the second negative signal measurement 404B, a fourth negative signal measurement 404D identified as a second length classification subsequent to the third negative signal measurement 404C, a fifth negative signal measurement 404E identified as a third length classification subsequent to the fourth negative signal measurement 404D, a sixth negative signal measurement 404F identified as a first length classification subsequent to the fifth negative signal measurement 404E, and a sixth negative signal measurement 404G identified as a second length classification subsequent to the fifth negative signal measurement 404E.

The decoding apparatus 200 can leverage the decoding framework to generate the output bit stream 408 based at least in part on the length classifications identified for each negative signal measurement of the negative measurement stream. For example, the decoding framework can define one or more specific decoding rules for each length classification that can correlate a respective length classification to one or more bit values for at least one portion of the output bit stream 408. In this way, the decoding apparatus can leverage the decoding framework to generate at least one portion of the output bit stream 408 for the demodulated digital signal 402 based at least in part on a length classification for at least one negative signal measurement.

By way of example, the decoding framework can define one or more first length classification decoding rules. The first length classification decoding rules can define a one bit value for a respective first length classification based at least in part on a placement of the first length classification. In this manner, a first length classification can represent one bit of the output bit stream 408 based at least in part on a placement of the first length classification. In addition, or alternatively, the decoding framework can define one or more second length classification decoding rules. The second length classification decoding rules can define a one bit value and/or a two bit value for a respective second length classification based at least in part on a placement of the second length classification. In this manner, a second length classification can represent one or two bits of the output bit stream 408 based at least in part on a placement of the second length classification. In some embodiments, the decoding framework can define one or more third length classification decoding rules. The third length classification decoding rules can define a two bit value for a respective third length classification based at least in part on a placement of the third length classification. In this manner, a third length classification can represent two bits of the output bit stream 408 based at least in part on a placement of the third length classification.

In some embodiments, the one or more bit values for at least one portion of the output bit stream 408 can be based at least in part on a length classification for a signal measurement and/or a preceding bit value immediately preceding the signal measurement. For example, at least one portion of the output bit stream 408 can include a current value for at least one current bit of the output bit stream 408. The current value for the at least one bit can be generated by identifying the preceding value for a preceding bit of the output bit stream 408 that immediately precedes the at least one portion of the output bit stream. The current value for the at least one current bit of the output bit stream 408 can be based at least in part on the preceding value for the preceding bit of the output bit stream 408 and the length classification identified for the signal measurement.

In addition, or alternatively, the one or more bit values for at least one portion of the output bit stream 408 can be based at least in part on the length classification for the signal measurement and/or a preceding carrier classification immediately preceding the signal measurement. By way of example, the second length classification can be divided into multiple sub-classifications. The sub-classifications can include a plurality of carrier classifications. The plurality of carrier classifications can be associated with a phase shift of the demodulated digital signal 402. For example, each carrier classification can be indicative of a phase change between two respective phases of the demodulated digital signal 402. By way of example, the plurality of carrier classifications can include a first carrier classification and a second carrier classification. The first carrier classification can be indicative of a phase change from a first phase to a second phase of the demodulated digital signal 402. The second carrier classification can be indicative of a phase change from the second phase to the first phase of the demodulated digital signal 402.

A respective phase of the demodulated digital signal 402 can correspond to one or more bit values for the output bit stream 408. For example, the first phase can be indicative of a first bit value (e.g., 0) and the second phase can be indicative of a second bit value (e.g., 1). The length classifications can each identify whether a phase change and/or how many phase changes occur over a duration of time. For example, the first length classification can be indicative of zero phase changes over a single unit of the demodulated digital signal 402. The third length classification can be indicative of two phase changes over two units of the demodulated digital signal 402. The second classification can be indicative of one phase change over one and half units of the demodulated digital signal 402. The occurrence of zero, or two consecutive phase changes, for one signal measurement (e.g., with a first/third length classification) can either not change or correct the current phase of the demodulated digital signal 402 for subsequent signal measurements. The occurrence of one phase change for one signal measurement (e.g., with a second length classification) can change the current phase of the demodulated digital signal 402 for subsequent signal measurements which can impact the portion of the output bit stream 240 generated based at least in part on the subsequent signal measurements.

The decoding framework can define one or more decoding rules for generating a portion of the output bit stream 408 for the demodulated digital signal based at least in part on a length classification for a signal measurement and a preceding carrier classification for the respective measurement stream.

For example, a first length classification can be decoded to a single bit value for a single bit of the output bit stream 408. The single bit value can be based at least in part on a preceding carrier classification that immediately precedes the signal measurement for which a first length classification is identified. In some embodiments, the single bit value can be based at least in part on the particular measurement type and/or inverted/non-inverted coding type of a measurement stream. For example, for a non-inverted negative measurement stream, the single bit value can include a zero (e.g., 0) in the event that the preceding carrier classification is a first carrier classification (e.g., the demodulated digital signal is in a second phase). In addition, or alternatively, for the non-inverted negative measurement stream, the single bit value can include a one (e.g., 1) in the event that the preceding carrier classification is a second carrier classification (e.g., the demodulated digital signal is in first phase). In some embodiments, the inverse may be defined for a non-inverted positive measurement stream. By way of example, for a non-inverted positive measurement stream, the single bit value can include a one (e.g., 1) in the event that the preceding carrier classification is a first carrier classification and a zero (e.g., 0) in the event that the preceding carrier classification is a second carrier classification. These values can be inverted for an inverted negative and/or positive measurement stream.

As another example, the second length classification can be decoded as a single bit value for a single bit of the output bit stream 408 and/or as a pair of bit values for two bits of the output bit stream 408. The bit values can be based at least in part on the current carrier classification identified for the second length classification.

For example, a second length classification that is identified as a first carrier classification can be decoded as a single bit value for a single bit of the output bit stream 408. The first carrier classification can occur in the event that a signal measurement begins in the middle of a code duration. In such a case, the second length classification can be decoded as a single bit value. The bit value can be based at least in part on an inverted/non-inverted coding type of the demodulated digital signal. In some embodiments, the bit value can be the inverted value of a preceding bit value decoded for a signal measurement immediately preceding the second length classification. In some embodiments, the bit value can be based at least in part on the particular measurement type and/or inverted/non-inverted coding type of a measurement stream. For instance, for a non-inverted negative measurement stream, the single bit value can include a zero (e.g., 0). For a non-inverted positive measurement stream, the single bit value can include a one (e.g., 1). These values can be inverted for an inverted negative and/or positive measurement stream.

In addition, or alternatively, a second length classification that is identified as a second carrier classification can be decoded as a pair of bit values for two bits of the output bit stream 408. The second carrier classification can occur in the event that a signal measurement begins at the beginning of a code duration. In such a case, the second length classification can be decoded as a double bit value. The double bit value can be based at least in part on an inverted/non-inverted coding type of the demodulated digital signal. In some embodiments, if there is a preceding bit value, the pair of bit values can include (i) a first bit value that is the same as the preceding bit value decoded for a signal measurement immediately preceding the second length classification and (ii) a second bit value that is the inverted value of the first bit value. In some embodiments, the pair of bit values can be based at least in part on the particular measurement type and/or inverted/non-inverted coding type of a measurement stream. For instance, for a non-inverted negative measurement stream, the pair of bit values can include a zero, one (e.g., 01). For a non-inverted positive measurement stream, the pair of bit values can include a one, zero (e.g., 10). These values can be inverted for an inverted negative and/or positive measurement stream.

In a measurement stream, a first carrier classification can follow a second carrier classification and a second carrier classification can follow a first carrier classification such that a carrier classification can alternate for each second length classification of the measurement stream. By way of example, a second length classification can be identified as a first carrier classification in the event that the preceding carrier classification is a second carrier classification. In the event that the preceding carrier classification is a first carrier classification, a second length classification can be identified as a second carrier classification. For a negative measurement stream, the first signal measurement with a second length classification can be a second carrier classification. For a positive measurement stream, the first signal measurement with a second length classification can be a first carrier classification.

The third length classification can be decoded as a pair of bit values for two bits of the output bit stream 408. In some embodiments, the pair of bit values can be based at least in part on the particular measurement type and/or inverted/non-inverted coding type of a measurement stream. For instance, for a non-inverted negative measurement stream, the pair of bit values can include a zero, one (e.g., 01). For a non-inverted positive measurement stream, the pair or bit values can include one, zero (e.g., 10). These values can be inverted for an inverted negative and/or positive measurement stream. In addition, or alternatively, the pair of bit values can be based at least in part on a preceding bit value immediately preceding the signal measurement.

FIG. 4C illustrates an operational example of for decoding a third length classification in accordance with one or more embodiments of the present disclosure. The operational example illustrates two decoding scenarios for a third length classification.

The first decoding scenario 422 can include a non-inverted scenario in which the demodulation digital signal includes non-inverted signals 424. In the first decoding scenario 422, the preceding bit value 426 immediately preceding the signal measurement 428 classified as the third length classification can include a bit value of one. In such a case, the third length classification can be decoded as a pair of bit values: zero, one (e.g., 01).

The second decoding scenario 432 can include an inverted scenario in which the demodulation digital signal includes inverted signals 434. In the second decoding scenario 432, the preceding bit value 436 immediately preceding the signal measurement 438 classified as the third length classification can include a bit value of zero. In such a case, the third length classification 438 can be decoded as a pair of bit values: one, zero (e.g., 10). In this way, if a coded data stream is inverted, the inverted result is captured by the decoded values for the third length classification.

This can apply for each length classification. By way of example, in an inverted scenario, the bit values for each length classification can also be inverted (e.g., a one can become a zero, and/or the like).

In some embodiments, an inverted/non-inverted coding type of a demodulation digital signal can be unknown. In such a case, one or more synchronization bytes of the demodulated digital signal can be leveraged to determine whether the demodulated digital signal is inverted. For instance, an inverted demodulated digital signal can be identified in the event that a third length classification, instead of a second length classification, is identified at the beginning of the synchronization bytes. In some embodiments, the demodulated digital signal can include a FeliCa communication and the synchronization bytes can include a non-inverted bit stream xB2 followed x4D (HEX values) and/or an inverted bit stream x4D followed by xB2. In such a case, the initial bit stream for the demodulated digital signal can be analyzed to identify whether the demodulated digital signal is inverted or non-inverted.

FIG. 5 provides a flowchart diagram of an example process 500 for generating an output bit stream in accordance with one or more embodiments of the present disclosure. The process 500 leverages, in some examples, a specific rules-based decoding framework to generate an accurate output bit stream for a demodulated digital signal despite the presence of distortions to the demodulated digital signal such as, for example, duty cycle distortion, jitter, and/or the like. The process 500 can be implemented by one or more computing devices, entities and/or systems described herein. For example, the decoding apparatus 200 can utilize the process 500 to overcome various limitations with conventional decoding mechanisms that are susceptible to jitter, duty cycle distortion, and/or other transformations to a demodulated digital signal.

FIG. 5 illustrates an example process 500 for explanatory purposes. The process 500 can include a computer-implemented method with one or more steps/operations performed by various computing components including, for example, digital circuitry such as digital circuits, and/or the like. Although the example process 500 depicts a particular sequence of steps/operations, the sequence may be altered without departing from the scope of the present disclosure. For example, some of the steps/operations depicted may be performed in parallel or in a different sequence that does not materially impact the function of the process 500. In other examples, different components of an example device or system that implements the process 500 may perform functions at substantially the same time or in a specific sequence.

According to some examples, the process 500 includes, at step/operation 502, receiving a demodulated digital signal. For example, the decoding apparatus 200 can receive the demodulated digital signal from a demodulator as described herein.

According to some examples, the process 500 includes, at step/operation 504, generating a signal measurement. For example, the decoding apparatus 200 can generate the signal measurement for the demodulated digital signal. As described herein, the signal measurement can include at least one signal length between two edges of the demodulated digital signal.

According to some examples, the process 500 includes, at step/operation 506, identifying a signal length classification. For example, the decoding apparatus 200 can identify the signal length classification for the signal measurement as described herein. The signal length classification, for example, can include a first length classification, a second length classification, and/or a third length classification.

According to some examples, the process 500 includes, at step/operation 508, identifying a preceding carrier classification. For example, the decoding apparatus 200 can identify the preceding carrier classification for the signal measurement as described herein. The preceding carrier classification, for example, can correspond to a historical signal measurement preceding the signal measurement.

By way of example, a plurality of sequential signal measurements can be generated for the demodulated digital signal. A signal length classification can be identified for each of the plurality of sequential signal measurements to generate a sequential set of signal length classifications. Each of the signal length classifications can include a first length classification, a second length classification, and/or a third length classification. In addition, or alternatively, each of the second length classifications of the sequential set of signal length classifications can include a respective carrier classification. For a current signal measurement, the preceding carrier classification can include the most recent carrier classification of the sequential set of signal length classifications. For example, the preceding carrier classification can include the last carrier classification identified for the plurality of signal measurements preceding the current signal measurement.

In some embodiments, the preceding carrier classification can be identified from the sequential set of signal length classifications. For example, the decoding apparatus 200 can store the sequential set of signal length classifications and search the sequential set of signal length classifications for the preceding carrier classification. In addition, or alternatively, the preceding carrier classification can be identified by a phase indicator such as a flag, a state machine, and/or any other indicator indicative of a current phase of the demodulated digital signal. The decoding apparatus 200 can update the phase indicator (e.g., flip a flag, change a state, etc.) in response to identifying a carrier classification for a signal measurement.

The sequential signal measurements can include an initial signal measurement. In some embodiments, the preceding carrier classification for an initial signal measurement can include an initial carrier classification. By way of example, for a negative measurement stream, the initial carrier classification can include a first carrier classification. As another example, for a positive measurement stream, the initial carrier classification can include a second carrier classification.

According to some examples, the process 500 includes, at step/operation 510, generating a portion of the output bit stream. For example, the decoding apparatus 200 can generate the portion of the output bit stream based at least in part on the signal length classification and the preceding carrier classification for the signal measurement. In some embodiments, the decoding apparatus 200 can generate at least the portion of the output bit stream by leveraging one or more specific decoding rules defined by the decoding framework. By way of example, the decoding framework can define a plurality of decoding rules for assigning one or more bit values to one or more bits of the output bit stream based at least in part on the signal length classification, the preceding carrier classification, and/or a measurement type for the signal measurement. The specific decoding rules can identify one or more specific bit values for the one or more bits for each combination of signal length classification, preceding carrier classification, and/or measurement type.

By way of example, a first length classification can correspond to a specific single bit value based at least in part on the preceding carrier classification and/or the measurement type. The second length classification can correspond to a specific single bit value or a specific double bit value based at least in part on the preceding carrier classification (and/or a current carrier classification) and/or the measurement type. The third length classification can correspond to a specific double bit value based at least in part on the preceding carrier classification and/or the measurement type. In some embodiments, the values for each of the first, second, and third length classifications can be based at least in part on whether a signal measurement is a negative signal measurement for a negative measurement stream and/or a positive signal measurement for a positive measurement stream.

For example, the decoding apparatus 200 can determine that the at least one signal length for a signal measurement corresponds to the first length classification. In response, the decoding apparatus 200 can assign a specific single bit value to at least one portion of the output bit stream based at least in part on the preceding carrier classification. By way of example, for a negative measurement stream, the specific single bit value can include a zero (e.g., 0) in the event that the preceding carrier classification is a first carrier classification and a one (e.g., 1) in the event that the preceding carrier classification is a second carrier classification. In some embodiments, for a positive measurement stream, the specific single bit value can include a one (e.g., 1) in the event that the preceding carrier classification is a first carrier classification and a zero (e.g., 0) in the event that the preceding carrier classification is a second carrier classification.

In addition, or alternatively, the decoding apparatus 200 can determine that the at least one signal length for a signal measurement corresponds to the second length classification. In response, the decoding apparatus 200 can assign the specific single bit value or the specific double bit value to the at least one portion of the output bit stream based at least in part on the preceding carrier classification. By way of example, for a negative measurement stream, bit value can include a specific single bit value of zero (e.g., 0) in the event that the preceding carrier classification is a second carrier classification (e.g., current carrier classification is a second carrier classification) and a specific double bit value of zero, one (e.g., 01) in the event that the preceding carrier classification is a first carrier classification (e.g., current carrier classification is a second carrier classification). In some embodiments, for a positive measurement stream, the bit value can include specific single bit value of one (e.g., 1) in the event that the preceding carrier classification is a second carrier classification (e.g., current carrier classification is a first carrier classification) and a specific double bit value of one, zero (e.g., 10) in the event that the preceding carrier classification is a first carrier classification (e.g., current carrier classification is a second carrier classification).

In addition, or alternatively, the decoding apparatus 200 can determine that the at least one signal length for a signal measurement corresponds to the third length classification. In response, the decoding apparatus 200 can assign the specific double bit value to the at least one portion of the output bit stream based at least in part on the preceding carrier classification and/or the measurement type. By way of example, for a negative measurement stream, the specific double bit value can include a zero, one (e.g., 01). In some embodiments, for a positive measurement stream, the specific double bit value can include a one, zero (e.g., 01).

In some embodiments, the decoding apparatus 200 can be configured to decode a demodulated digital signal based at least in part on one (e.g., negative/positive) measurement stream. In some embodiments, to increase the accuracy of the output bit stream, the decoding apparatus 200 can leverage two independent measurement streams (e.g., negative and positive) to decode the demodulated digital signal. For example, a first measurement stream (e.g., a negative measurement stream) can represent a lead or primary stream for decoding the demodulated digital signal and a second measurement stream (e.g., a positive measurement stream) can represent an arbitrary or secondary stream for decoding the demodulated digital signal. In the event that the decoding apparatus 200 detects an irregular sequence and/or any other error associated with the decoding of the demodulated digital signal, the decoding apparatus 200 can leverage the arbitrary or secondary stream to solve the irregular sequence and/or the like. In this way, a double stream decoding framework can further improve a decoder's robustness in the presence of duty cycle distortion, jitter, and/or the like.

FIG. 6 illustrates an example decoding apparatus 600 in accordance with one or more embodiments of the present disclosure. The decoding apparatus 600 can include a computing entity configured to apply a double stream decoding framework to generate an output bit stream 626 for a demodulated digital signal. The decoding apparatus 600 includes a lead stream decoder 602, an arbitrary stream decoder 604, and an arbitration coordinator 606. Each of the lead stream decoder 602, the arbitrary stream decoder 604, and/or the arbitration coordinator 606 can include digital circuitry and/or computer-implemented memories specially configured to perform one or more operations of the present disclosure.

The lead stream decoder 602 can include a lead signal measurement component 608 configured to generate a plurality of signal measurements for a lead measurement stream. The lead measurement stream can include a plurality of lead signal measurements. A lead signal measurement can include at least one signal length that is descriptive of a lead length type for decoding the demodulated digital signal. The lead length type can include (i) a negative length type descriptive of a negative length between two consecutive falling edges of the demodulated digital signal or (ii) a positive length type descriptive of the positive length between two consecutive rising edges of the demodulated digital signal.

The lead measurement stream can be based at least in part on the lead length type for decoding the demodulated digital signal. For instance, the lead measurement stream can include a negative measurement stream in the event that the lead length type is a negative length type. In addition, or alternatively, the lead measurement stream can include a positive measurement stream in the event that the lead length type is a positive length type. For exemplary purposes, the lead length type can include a negative length type and the lead measurement stream can include a negative measurement stream based at least in part on a plurality of negative signal measurements of the demodulated digital signal.

The arbitrary stream decoder 604 can include an arbitrary signal measurement component 610 configured to generate a plurality of signal measurements for an arbitrary measurement stream. The arbitrary measurement stream can include a plurality of arbitrary signal measurements. An arbitrary signal measurement can include at least one signal length that is descriptive of an arbitrary length type for decoding the demodulated digital signal. The arbitrary length type can include (i) a negative length type descriptive of a negative length between two consecutive falling edges of the demodulated digital signal or (ii) a positive length type descriptive of the positive length between two consecutive rising edges of the demodulated digital signal. In some embodiments, the arbitrary length type can be opposite to the lead length type.

For example, the arbitrary measurement stream can include a measurement stream with a plurality of arbitrary signal measurements of an opposite type to the lead length type. By way of example, the arbitrary measurement stream can include (i) a positive measurement stream in the event that the lead measurement stream is a negative measurement stream and/or (ii) a negative measurement stream in the event that the lead measurement stream is a positive measurement stream. For exemplary purposes, the arbitrary length type can include a positive length type and the arbitrary measurement stream can include a positive measurement stream based at least in part on a plurality of positive signal measurements of the demodulated digital signal. The arbitrary signal measurement component 610 can function independently of the lead signal measurement component 608.

The lead stream decoder 602 can include a lead length classification component 612 configured to identify a plurality of length classifications for the plurality of lead signal measurements of the lead measurement stream. The arbitrary stream decoder 604 can include an arbitrary length classification component 614 configured to identify a plurality of length classifications for the plurality of arbitrary signal measurements of the arbitrary measurement stream. The arbitrary length classification component 614 can function independently of the lead length classification component 612.

The lead stream decoder 602 can include a lead data conversion component 616 configured to decode the demodulated digital signal based at least in part on (i) the plurality of length classifications identified for the plurality of lead signal measurements, and (ii) the lead length type to generate at least a portion of a lead output bit stream for the demodulated digital signal. The plurality of lead signal measurements can be decoded using one or more specific decoding rules corresponding to the lead measurement stream. For example, the decoding framework can define one or more different decoding rules for a positive measurement stream and/or a negative measurement stream. By way of example, the specific decoding rules can include a plurality of negative decoding rules for decoding negative signal measurements of a negative measurement stream. In addition, or alternatively, the specific decoding rules can include a plurality of positive decoding rules for decoding positive signal measurements of a positive measurement stream. The lead stream decoder 602 can leverage one or more different decoding rules of the decoding framework based at least in part on the lead length type indicative of whether the lead measurement stream is a positive measurement stream or a negative measurement stream. For exemplary purposes, the lead stream decoder 602 can leverage the plurality of negative decoding rules for decoding the demodulated digital signal based at least in part on the plurality of length classifications identified for a plurality of negative signal measurements.

The arbitrary stream decoder 604 can include an arbitrary data conversion component 618 configured to decode the demodulated digital signal based at least in part on (i) the plurality of length classifications identified for the plurality of arbitrary signal measurements, and (ii) the arbitrary length type to generate at least a portion of an arbitrary output bit stream for the demodulated digital signal. The plurality of arbitrary signal measurements can be decoded using one or more specific decoding rules corresponding to the arbitrary measurement stream. For example, the arbitrary stream decoder 604 can leverage one or more different decoding rules of the decoding framework based at least in part on the arbitrary length type. For exemplary purposes, the arbitrary stream decoder 604 can leverage the plurality of positive decoding rules for decoding the demodulated digital signal based at least in part on the plurality of length classifications identified for a plurality of positive signal measurements.

The arbitrary data conversion component 618 can function independently of the lead data conversion component 616. When accurately functioning, the resulting arbitrary output bit stream for the demodulated digital signal generated by the arbitrary stream decoder 604 can include the same sequence of bit values as the lead output bit stream for the demodulated digital signal generated by the lead stream decoder 602.

The arbitration coordinator 606 can include an arbitration resolver 620 configured to detect an uncertainty associated with a lead signal measurement and perform one or more arbitration actions to handle the uncertainty. The arbitration coordinator 606 can include a decoder history including historical signal data indicative of one or more previous lead/arbitrary signal measurements and/or one or more lead/arbitrary length classifications. In addition, or alternatively, the arbitration coordinator 606 can include one or more data stream alignment components configured to align the lead measurement stream with the arbitrary measurement stream based at least in part on the decoder history. The data stream alignment components can include a lead output bit stream alignment component 622 configured to maintain a history of one or more previous lead signal measurements, one or more lead length classifications, and/or one or more portions of a lead output bit stream generated for a demodulated digital signal based at least in part on the one or more previous lead signal measurements. In addition, or alternatively, the data stream alignment components can include an arbitrary output bit stream alignment component 624 configured to maintain a history of one or more previous arbitrary signal measurements, one or more arbitrary length classifications, and/or one or more portions of an arbitrary output bit stream generated for a digital signal based at least in part on the one or more previous arbitrary signal measurements.

The arbitration coordinator 606 can improve decoder performance by utilizing arbitrary signal measurements to handle uncertainty associated with lead signal measurements. The uncertainty can be induced by any alteration to a demodulated digital signal such as, for example, in the case of slight alterations due to jitter. In some embodiments, phenomena such as jitter can impact one type of edge of a demodulated digital signal (e.g., a negative edge or a positive edge) without impacting the opposite edge of the demodulated digital signal such that uncertainty associated with signal measurements of one measurement type can be compensated for by signal measurements of the opposite measurement type. In this way, the decoding apparatus 600 can improve decoding accuracy of demodulated digital signals by decoding the demodulated digital signal using a lead measurement stream measuring distances between a first edge type of the demodulated digital signal and, in the event of uncertainty with the lead measurement stream, using an arbitrary measurement stream measuring distances between a second, opposite edge type of the demodulated digital signal to resolve the uncertainty.

For exemplary purposes, the arbitration coordinator 606 can decode the demodulated digital signal using a negative measurement stream measuring distances between negative edges of the demodulated digital signal and, in the event of uncertainty with the negative measurement stream, use a positive measurement stream measuring distances between positive edges of the demodulated digital signal to resolve the uncertainty. By way of example, the lead length type for decoding the demodulated digital signal can be the negative length type descriptive of the negative length between a falling edge of the demodulated digital signal and a consecutive falling edge of the demodulated digital signal. In addition, or alternatively, the arbitrary length type for decoding the demodulated digital signal can be the positive length type descriptive of the positive length between a rising edge of the demodulated digital signal and a consecutive rising edge of the demodulated digital signal.

In example embodiments, the opposite configuration may be applied such that a demodulated digital signal is decoded using the positive measurement stream and the negative measurement stream is used to resolve uncertainty with the positive measurement stream. By way of example, the lead length type for decoding the demodulated digital signal can be the positive length type and the arbitrary length type for decoding the demodulated digital signal can be the negative length type.

The arbitration coordinator 606 can be configured to determine an uncertainty with the lead measurement stream based at least in part on a particular lead signal measurement. In some embodiments, the uncertainty can be based at least in part on an alignment error associated with the particular lead signal measurement. For example, the arbitration coordinator 606 can detect an alignment error associated with the particular lead signal measurement and determine an uncertainty with the lead measurement stream based at least in part on the alignment error. The uncertainty can be indicative of the presence of an alignment error.

An alignment error can be based at least in part on one or more defined arbitration length classifications associated with particular time ranges. For example, the decoding framework can define one or more defined arbitration clock cycle ranges associated with an arbitration length classification. In some embodiments, the one or more defined arbitration clock cycle ranges can include one or more ranges between each of the clock cycle ranges corresponding to the plurality of defined length classifications. For example, the defined arbitration clock cycle ranges can include: (i) a first arbitration clock cycle range including a range before a respective clock cycle range corresponding to the first length classification, (ii) a second arbitration clock cycle range including a range between the respective clock cycle range corresponding to the first length classification and a respective clock cycle range corresponding to the second length classification, (iii) a third arbitration clock cycle range including a range between the respective clock cycle range corresponding to the second length classification and a respective clock cycle range corresponding to the third length classification, and/or (iv) a fourth arbitration clock cycle range including a range after the respective clock cycle range corresponding to the third length classification.

In some embodiments, the one or more defined arbitration clock cycle ranges can be based at least in part on (i) a data transfer rate associated with the demodulated digital signal and/or (ii) one or more Manchester coded data bit durations. In some embodiments, for example, the arbitration clock cycle ranges can include a clock cycle range that is between a first clock cycle range associated with a Manchester coded data bit duration and a second clock cycle range associated with the Manchester coded data bit duration.

By way of example, a demodulated digital signal can be associated with a plurality of different data transfer rates and/or coded data streams. In some embodiments, the decoding framework can define one or more different clock cycle ranges for an arbitration length classification based at least in part on a particular data transfer rate and/or coded data stream associated with a demodulated digital signal. As one example, a demodulated digital signal can be associated with a first data transfer rate (e.g., 212 kbps) and/or a second data transfer rate (e.g., 424 kbps) and the decoding framework can define a different clock cycle range for a respective arbitration length classification based at least in part on whether the demodulated digital signal is associated with the first or second data transfer rate.

As one example, the decoding framework can define, for the first data transfer rate, (i) a first arbitration clock cycle range that is associated with a range of forty four to fifty one (e.g., 44-51) clock cycles, (ii) a second arbitration clock cycle range that is associated with a range of seventy five to eighty three (e.g., 75-83) clock cycles, (iii) a third arbitration clock cycle range that is associated with a range of one hundred and seven to one hundred and fifteen (e.g., 107-115) clock cycles, and/or (iv) a fourth arbitration clock cycle range that is associated with a range of one hundred and thirty nine to one hundred and forty two (e.g., 139-142) clock cycles.

As another example, the decoding framework can define, for the second data transfer rate, (i) a first arbitration clock cycle range that is associated with a range twenty two to twenty five (e.g., 22-25) clock cycles, (ii) a second arbitration clock cycle range that is associated with a range of thirty eight to forty one (e.g., 38-41) clock cycles, (iii) a third arbitration clock cycle range that is associated with a range of fifty four to fifty seven (e.g., 54-57) clock cycles, and/or (iv) a fourth arbitration clock cycle range that is associated with a range of seventy to seventy three (e.g., 70-73) clock cycles.

Responsive to detecting an alignment error associated with a lead signal measurement, the arbitration coordinator 606 can generate at least one portion of the output bit stream for the demodulated digital signal based at least in part on an arbitrary signal measurement for the demodulated digital signal. For example, the decoding apparatus 600 can generate the portion of the output bit stream based at least in part on one or more arbitrary signal measurements that overlap (e.g., are measured at overlapping times) with the lead signal measurement.

In some embodiments, the decoding framework can define one or more specific sequencing rules for detecting inaccurate sequences for an output bit stream. The one or more specific sequencing rules, for example, can include combinations and/or sequences of length classifications that are indicative of a decoding error for the demodulated digital signal. A first sequencing rule, for example, can define that a first carrier classification may be followed by a second carrier classification and that a second carrier classification may be followed by a first carrier classification. A second bit sequencing rule can define that a second carrier classification may occur on the same stream type (e.g., a negative/positive stream) as a previous first carrier classification. A third sequencing rule can define that after a third length classification, the next carrier classification may be a second carrier classification, where the first carrier classification and/or the third length classification can occur on the same or opposite streams.

FIG. 7 illustrates a block diagram of an example process 700 for generating an output bit stream in accordance with one or more embodiments of the present disclosure. The process 700 leverages a specific rules-based decoding framework to generate an accurate output bit stream for a demodulated digital signal despite the presence of distortions to the demodulated digital signal such as, for example, duty cycle distortion, jitter, and/or the like. The process 700 can be implemented by one or more computing devices, entities and/or systems described herein. For example, the decoding apparatus 600 can utilize the process 700 to overcome various limitations with conventional decoding mechanisms that are susceptible to jitter, duty cycle distortion, and/or other transformations to a demodulated digital signal.

FIG. 7 illustrates an example process 700 for explanatory purposes. The process 700 can include a computer-implemented method with one or more steps/operations performed by various computing components including, for example, digital circuitry such as digital circuits, etc. Although the example process 700 depicts a particular sequence of steps/operations, the sequence may be altered without departing from the scope of the present disclosure. For example, some of the steps/operations depicted may be performed in parallel or in a different sequence that does not materially impact the function of the process 700. In other examples, different components of an example device or system that implements the process 700 may perform functions at substantially the same time or in a specific sequence.

According to some examples, the process 700 includes, at step/operation 702, receiving a demodulated digital signal. For example, the decoding apparatus 600 can receive the demodulated digital signal from a demodulator as described herein.

According to some examples, the process 700 includes, at step/operation 704, generating at least one signal measurement for the demodulated digital signal. For example, the decoding apparatus 600 can generate a lead signal measurement for the demodulated digital signal and an arbitrary signal measurement as described herein.

According to some examples, the process 700 includes, at step/operation 706, detecting that a lead signal measurement for the demodulated digital signal is associated with an alignment error. For example, the decoding apparatus 600 can compare the at least one signal length of the lead signal measurement to a plurality of defined arbitration clock cycle ranges to determine that the lead signal measurement corresponds to an arbitration length classification.

According to some examples, the process 700 includes, at step/operation 708, identifying a signal length classification for the arbitrary signal measurement in response to detecting that the lead signal measurement is associated with the alignment error. For example, the decoding apparatus 600 can identify the signal length classification for the arbitrary signal measurement as described herein.

According to some examples, the process 700 includes, at step/operation 710, in response to identifying the signal length classification for the arbitrary signal measurement, generating a portion of the output bit stream for the demodulated digital signal based at least in part on the signal length classification corresponding to the arbitrary signal measurement. For example, the decoding apparatus 600 can leverage a decoding framework to generate the portion of the output bit stream for the demodulated digital signal based at least in part on the signal length classification corresponding to the arbitrary signal measurement.

After generating the portion of the output bit stream for the demodulated digital signal, the process 700 can return to step/operation 704 at which the decoding apparatus 600 can generate another signal measurement for the demodulated digital signal.

According to some examples, the process 700 includes, at step/operation 712, determining that the arbitrary signal measurement does not correspond to a signal length classification. For example, the decoding apparatus 600 can determine that the arbitrary signal measurement does not correspond to a signal length classification.

According to some examples, the process 700 includes, at step/operation 714, in response to determining that the arbitrary signal measurement does not correspond to a signal length classification, generating a decoding error for the digital signal. For example, the decoding apparatus 600 can generate the decoding error for the digital signal. The decoding error can include an error message indicative of a potential inaccuracy associated with the demodulated digital signal and/or the process 700.

In response to a decoding error, the process 700 can proceed to step/operation 716 at which the process 700 can end. In some embodiments, the process 700 includes, at step/operation 716, providing an output bit stream representative of the decoded demodulated digital signal. In the event of the decoding error, the output bit stream can be representative of a portion of the decoded demodulated digital signal. In some embodiments, for example in response to a decoding error, the process 700 can proceed to step/operation 702 at which the decoding apparatus can receive another demodulated digital signal.

According to some examples, the process 700 includes, at step/operation 718, determining that the arbitrary signal measurement corresponds to an end of the demodulated digital signal. For example, the decoding apparatus 600 can determine that the arbitrary signal measurement corresponds to the end of the demodulated digital signal based at least in part on the at least one signal length of the arbitrary signal measurement. The end of the demodulated digital signal, for example, can be identified based at least in part on a time between two edges of the demodulated digital signal. For example, the decoding apparatus 600 can determine that the arbitrary signal measurement corresponds to the end of the demodulated digital signal in the event that the at least one signal length of the signal measurement is indicative of an end clock cycle range that is longer than the clock cycle range corresponding the third length classification. By way of example, the end clock cycle range can be associated with a clock cycle range that exceeds seventy four (e.g., 74) clock cycles for the first data transfer rate (e.g., 212 kbps) and/or a clock cycle range that exceeds thirty seven (e.g., 37) clock cycles for the second data transfer rate (e.g., 424 kbps).

In response to determining that the arbitrary signal measurement corresponds to the end of the demodulated digital signal, the process 700 can proceed to step/operation 716 at which the process 700 can provide the output bit stream for the decoded demodulated digital signal.

According to some examples, the process 700 includes, at step/operation 720, identifying a signal length classification for the lead signal measurement in response to detecting that the lead signal measurement is not associated with the alignment error. For example, the decoding apparatus 600 can identify the signal length classification for the lead signal measurement as described herein.

According to some examples, the process 700 includes, at step/operation 722, in response to identifying the signal length classification for the lead signal measurement, generating a portion of the output bit stream for the demodulated digital signal based at least in part on the signal length classification corresponding to the lead signal measurement. For example, the decoding apparatus 600 can generate the portion of the output bit stream for the demodulated digital signal based at least in part on the signal length classification corresponding to the lead signal measurement.

After generating the portion of the output bit stream for the demodulated digital signal, the process 700 can return to step/operation 704 at which the decoding apparatus 600 can generate another signal measurement for the demodulated digital signal.

According to some examples, the process 700 includes, at step/operation 724, determining that the lead signal measurement does not correspond to a signal length classification or an arbitrary length classification. For example, the decoding apparatus 600 can determine that the lead signal measurement does not correspond to a signal length classification or an arbitrary length classification. In such a case, the process 700 can proceed to step/operation 714 at which the decoding apparatus 600 can generate a decoding error for the digital signal.

According to some examples, the process 700 includes, at step/operation 726, determining that the lead signal measurement corresponds to the end of the demodulated digital signal. For example, the decoding apparatus 600 can determine that the lead signal measurement corresponds to the end of the demodulated digital signal based at least in part on the at least one signal length of the lead signal measurement. In response to determining that the lead signal measurement corresponds to the end of the demodulated digital signal, the process 700 can proceed to step/operation 716 at which the process 700 can provide the output bit stream for the decoded demodulated digital signal.

FIG. 8 illustrates an example decoding apparatus 800 in accordance with one or more embodiments of the present disclosure. The decoding apparatus 800 can include one or more decoding circuitries and/or a data framer 802. Each of the one or more decoding circuitries can be configured to separately generate an output bit stream 804 for a demodulated digital signal 806 based at least in part on a respective data transfer rate. For example, the decoding apparatus 800 can include a first decoding circuitry 808 configured to decode the demodulated digital signal 806 at a first data transfer rate. In addition, or alternatively, the decoding apparatus 800 can include a second decoding circuitry 810 configured to decode the demodulated digital signal 806 at a second data transfer rate.

Each decoding circuitry of the decoding apparatus 800 can include digital circuitry configured to independently apply the decoding framework described herein to generate the output bit stream 804 for the demodulated digital signal 806. By way of example, the first decoding circuitry 808 can include a first lead stream decoder 808A, a first arbitrary stream decoder 808B, and a first arbitration coordinator 808C each configured to apply the decoding framework at the first data transfer rate. The second decoding circuitry 810 can include a second lead stream decoder 810A, a second arbitrary stream decoder 810B, and a second arbitration coordinator 810C each configured to apply the decoding framework at the second data transfer rate.

The first and second data transfer rates can include any data transfer rate and can be based at least in part on the demodulated digital signal and/or a coding framework associated with the demodulated digital signal. In some embodiments, the demodulated digital signal can include a FeliCa-based communication that utilizes a Manchester coding scheme. In some embodiments, the FeliCa-based communication can be associated with at least two data transfer rates including, for example, a 212 kbps transfer rate and a 424 kbps transfer. In accordance with some embodiments of the present disclosure, the first data transfer rate can include the 212 kbps transfer rate and the second data transfer rate can include the 424 kbps transfer rate to accommodate for each data transfer rate associated with a FeliCa-based communication.

FIG. 9 illustrates an operational example of an output bit stream generated for a FeliCa-based demodulated digital signal in accordance with one or more embodiments of the present disclosure. As depicted, the FeliCa-based demodulated digital signal can include a plurality of defined FeliCa frame. The FeliCa frame include a plurality of bytes arranged in one or more fields including a header field 902, an information field 904, and an end field (not shown). The header field 902 can include a preamble 906 of six bytes and a sync 908 of two bytes. The information field 904 can include a length indicator 910 of one byte followed by a plurality of data bytes. The plurality of data bytes, for example, can include one to two hundred and fifty three data bytes. The end field can include two byte indicative of the end of the FeliCa frame.

Turning back to FIG. 8, the decoding apparatus 800 can generate a first output bit stream and a second output bit stream for the demodulated digital signal 806. The first output bit stream can be generated by the first decoding circuitry 808 according to the first data transfer rate and output to the data framer 802. The second output bit stream can be generated by the second decoding circuitry 810 according to the second data transfer rate and output to the data framer 802. In some embodiments, the first output bit stream and second output bit stream can be at least partially simultaneously generated by each respective decoding apparatus.

The decoding apparatus 800 can determine, via the data framer 802, the data transfer rate 812 corresponding to the demodulated digital signal 806 based at least in part on at least one portion of the first output bit stream and the second output bit stream. The at least one portion of the first output bit stream, for example, can include one or more first sync bytes 814 of the first output bit stream. The at least one portion of the second output bit stream, for example, can include one or more second sync bytes 816 of the second output bit stream. The data framer 802 can verify at least one of the output bit streams based at least in part on the determined data transfer rate 812 and output the verified out bit stream 804.

By way of example, using a FeliCa frame for explanatory purposes, the demodulated digital signal can be representative of FeliCa frame that begins with forty-eight zero bits.

After the preamble of forty-eight zero bits, the decoding apparatus 800 can detect the sync bytes of the FeliCa frame. The decoding apparatus 800 can fully decode the sync bytes for each output bit stream, compare the decoded sync bytes to one or more defined values for the FeliCa frame, and determine the data transfer rate 812 in the event that at least one of the decoded sync bytes correspond to the defined values for the FeliCa frame.

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the system. Therefore, it is to be understood that the disclosures are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to a Manchester encoding schemes, however, one skilled in the art may recognize that such principles may be applied to any other decoding scheme. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the disclosure(s) set out in any claims that may issue from this disclosure.

Use of broader terms such as "comprises," "includes," and "having" should be understood to provide support for narrower terms such as "consisting of," "consisting essentially of" and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While this detailed description has set forth some embodiments of the present disclosure, the appended claims cover other embodiments of the present disclosure which differ from the described embodiments according to various modifications and improvements. For example, the decoding techniques of the present disclosure can apply to any coding scheme to decoding accuracy for any of a plurality of different decoding mechanisms.

The invention claimed is:

1. A decoding apparatus comprising digital circuitry, the digital circuitry configured to:
   receive data indicative of a demodulated digital signal;
   generate a signal measurement for the demodulated digital signal, wherein the signal measurement comprises at least one signal length descriptive of: (i) a positive length between a first rising edge of the demodulated digital signal and a second consecutive rising edge of the demodulated digital signal or (ii) a negative length between a first falling edge of the demodulated digital signal and a second consecutive falling edge of the demodulated digital signal; and
   generate at least one portion of an output bit stream for the demodulated digital signal based at least in part on the signal measurement.

2. The decoding apparatus of claim 1, wherein generating the at least one portion of the output bit stream comprises:
   identifying a length classification for the signal measurement from a plurality defined length classifications; and
   generating the at least one portion of the output bit stream for the demodulated digital signal based at least in part on the length classification.

3. The decoding apparatus of claim 2, further comprising a synchronized clock, wherein the length classification is associated with a clock cycle range of the synchronized clock, and wherein identifying the length classification for the signal measurement comprises:
   identifying the length classification for the signal measurement based at least in part on a comparison between a plurality of clock cycles associated with the signal measurement and the clock cycle range.

4. The decoding apparatus of claim 3, wherein the clock cycle range is based at least in part on a data transfer rate associated with the demodulated digital signal.

5. The decoding apparatus of claim 3, wherein the clock cycle range is based at least in part on a Manchester coded data bit duration.

6. The decoding apparatus of claim 2, wherein the plurality defined length classifications comprise a first length classification based at least in part on one Manchester coded data bit duration, a second length classification based at least in part one and a half Manchester coded data bit durations, and a third length classification based at least in part on two Manchester coded data bit durations.

7. The decoding apparatus of claim 6, wherein the second length classification is associated with a plurality of carrier classifications associated with a phase shift of the demodulated digital signal, wherein the plurality of carrier classifications comprise a first carrier classification associated with a first phase of the demodulated digital signal and a second carrier classification associated with a second phase of the demodulated digital signal.

8. The decoding apparatus of claim 7, wherein generating the at least one portion of the output bit stream comprises:
   identifying a preceding carrier classification for the signal measurement, the preceding carrier classification corresponding to a historical signal measurement preceding the signal measurement; and
   generating the at least one portion of the output bit stream based, at least in part, on the preceding carrier classification.

9. The decoding apparatus of claim 8, wherein the first length classification corresponds to a single bit value based at least in part on the preceding carrier classification, and wherein generating the at least one portion of the output bit stream comprises:

determining that the signal measurement corresponds to the first length classification; and generating the single bit value for the at least one portion of the output bit stream based at least in part on the preceding carrier classification.

10. The decoding apparatus of claim 8, wherein the second length classification corresponds to a single bit value or a double bit value based at least in part on the preceding carrier classification, and wherein generating the at least one portion of the output bit stream comprises:

determining that the signal measurement corresponds to the second length classification; and generating the single bit value or the double bit value for the at least one portion of the output bit stream based at least in part on the preceding carrier classification.

11. The decoding apparatus of claim 1, wherein the signal measurement is a lead signal measurement for the demodulated digital signal, wherein the at least one signal length is descriptive of a lead length type for decoding the demodulated digital signal, wherein the lead length type comprise a negative length type descriptive of the negative length or a positive length type descriptive of the positive length.

12. The decoding apparatus of claim 11, wherein a first length classification corresponds to a single bit value based at least in part on the lead length type, and wherein generating the at least one portion of the output bit stream comprises:

determining that the signal measurement corresponds to the first length classification; and generating the single bit value for the at least one portion of the output bit stream based at least in part on the lead length type.

13. The decoding apparatus of claim 11, wherein a second length classification corresponds to a single bit value or a double bit value based at least in part on the lead length type, and wherein generating the at least one portion of the output bit stream comprises:

determining that the signal measurement corresponds to the second length classification; and generating the single bit value or the double bit value for the at least one portion of the output bit stream based at least in part on the lead length type.

14. The decoding apparatus of claim 11, wherein a third length classification corresponds to a double bit value based at least in part on the lead length type, and wherein generating the at least one portion of the output bit stream comprises:

determining that the signal measurement corresponds to the third length classification; and generating the double bit value for the at least one portion of the output bit stream based at least in part on the lead length type.

15. The decoding apparatus of claim 11, wherein the digital circuitry is further configured to:

generate an arbitrary signal measurement for the demodulated digital signal, wherein the arbitrary signal measurement comprises at least one arbitrary signal length that is descriptive of an arbitrary length type opposite to the lead length type; and generate at least a portion of an arbitrary output bit stream for the demodulated digital signal based at least in part on the arbitrary signal measurement.

16. The decoding apparatus of claim 15, wherein:

the lead length type for decoding the demodulated digital signal is the negative length type descriptive of the negative length between the first falling edge of the demodulated digital signal and the second consecutive falling edge of the demodulated digital signal, and the arbitrary length type for decoding the demodulated digital signal is the positive length type descriptive of the positive length between the first rising edge of the demodulated digital signal and the second consecutive rising edge of the demodulated digital signal.

17. The decoding apparatus of claim 15, wherein the digital circuitry is further configured to:

detect an alignment error associated with the lead signal measurement; and responsive to detecting the alignment error, generate the at least one portion of the output bit stream for the demodulated digital signal based at least in part on the arbitrary signal measurement for the demodulated digital signal.

18. The decoding apparatus of claim 17, wherein the alignment error is based at least in part on an arbitration length classification associated with one or more defined arbitration clock cycle ranges.

19. A computer-implemented method, comprising:

receiving data indicative of a demodulated digital signal;

generating a signal measurement for the demodulated digital signal, wherein the signal measurement comprises at least one signal length descriptive of: (i) a positive length between a first rising edge of the demodulated digital signal and a second consecutive rising edge of the demodulated digital signal or (ii) a negative length between a first falling edge of the demodulated digital signal and a second consecutive falling edge of the demodulated digital signal; and generating at least one portion of an output bit stream for the demodulated digital signal based at least in part on the signal measurement.

20. A computing system comprising at least one decoding apparatus and one or more radio transmission devices, the at least one decoding apparatus configured to:

receive data indicative of a demodulated digital signal based at least in part on one or more electrical signals from the one or more radio transmission devices;

generate a signal measurement for the demodulated digital signal, wherein the signal measurement comprises at least one signal length descriptive of: (i) a positive length between a first rising edge of the demodulated digital signal and a second consecutive rising edge of the demodulated digital signal or (ii) a negative length between a first falling edge of the demodulated digital signal and a second consecutive falling edge of the demodulated digital signal; and generate at least one portion of an output bit stream for the demodulated digital signal based at least in part on the signal measurement.

* * * * *